United States Patent [19]

Ueno et al.

[11] Patent Number: 4,697,422
[45] Date of Patent: Oct. 6, 1987

[54] METHOD OF AND APPARATUS FOR CONTROLLING SUPERCHARGE PRESSURE FOR A TURBOCHARGER

[75] Inventors: Takashi Ueno, Yokosuka; Toshimi Abo, Yokohama, both of Japan

[73] Assignee: Nissan Motor Co., Ltd., Kanagawa

[21] Appl. No.: 824,287

[22] Filed: Jan. 23, 1986

[30] Foreign Application Priority Data

Jan. 24, 1985 [JP] Japan .................. 60-11525

[51] Int. Cl.⁴ .................................. F02D 23/00
[52] U.S. Cl. ............................................. 60/602
[58] Field of Search ............... 60/600, 601, 602, 603

[56] References Cited

FOREIGN PATENT DOCUMENTS

| | | |
|---|---|---|
| 0136541 | 4/1985 | European Pat. Off. |
| 18522 | 2/1983 | Japan .................. 60/602 |
| 37228 | 2/1984 | Japan .................. 60/602 |
| 60-56126 | 4/1985 | Japan . |
| 60-56127 | 4/1985 | Japan . |
| 60-56128 | 4/1985 | Japan . |
| 60-139037 | 9/1985 | Japan . |
| 60-178931 | 9/1985 | Japan . |
| 60-182317 | 9/1985 | Japan . |
| 60-182318 | 9/1985 | Japan . |
| 60-182319 | 9/1985 | Japan . |
| 60-182321 | 9/1985 | Japan . |
| 60-209632 | 10/1985 | Japan . |
| 60-228728 | 11/1985 | Japan . |
| 60-240829 | 11/1985 | Japan . |
| 60-256540 | 12/1985 | Japan . |
| 61-49104 | 3/1986 | Japan . |
| 61-55316 | 3/1986 | Japan . |
| 61-65020 | 4/1986 | Japan . |
| 61-065021 | 4/1986 | Japan . |
| 61-138828 | 6/1986 | Japan . |
| 61-138829 | 6/1986 | Japan . |
| 61-138830 | 6/1986 | Japan . |
| 61-155624 | 7/1986 | Japan . |
| 61-164042 | 7/1986 | Japan . |

Primary Examiner—Stephen F. Husar
Attorney, Agent, or Firm—Schwartz, Jeffery, Schwaab, Mack, Blumenthal & Evans

[57] ABSTRACT

A method of and an apparatus for controlling supercharge pressure for a turbocharger, which perform the functions of detecting an acceleration condition from operating conditions of the engine, calculating and performing a feedback control using a capacity changing means when actual supercharge pressure reaches a first predetermined value after the acceleration condition has been determined, starting a correction of a control amount for the capacity changing means in the acceleration condition, and for increasing a first target value of the supercharge pressure when a predetermined time passes after the actual supercharge pressure reaches a second target value.

12 Claims, 24 Drawing Figures

FIG. 7
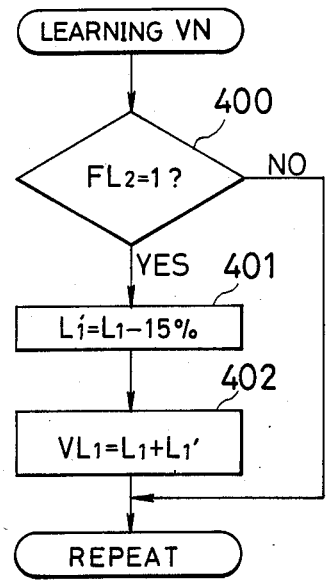
FIG. 8
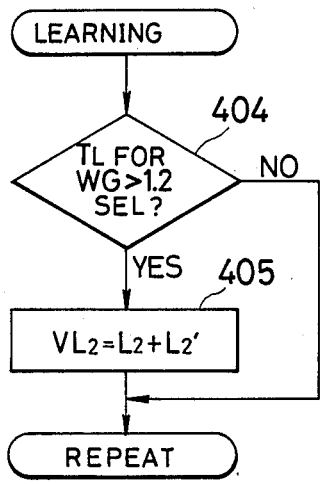
FIG. 9(A)
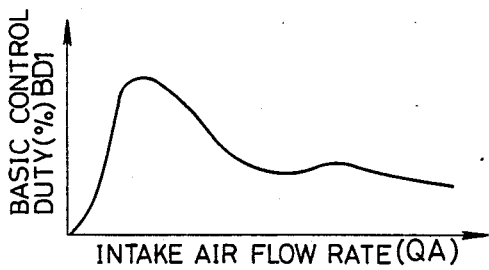
FIG. 9(B)
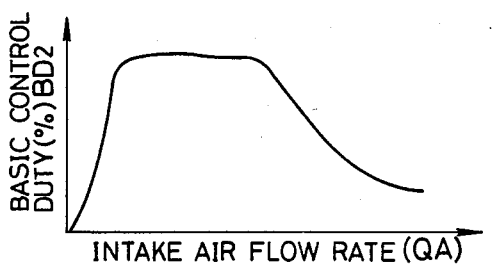
FIG. 9(C)
| QS | ADDRESS | CONTROL DUTY |
|---|---|---|
| 00 | 0 | 03 |
| 01 | 1 | F0H |
| ⋮ | ⋮ | ⋮ |
| OFFH | OFFH | 30H |

METHOD OF AND APPARATUS FOR CONTROLLING SUPERCHARGE PRESSURE FOR A TURBOCHARGER

BACKGROUND OF THE INVENTION

(1) Field of the Invention

The present invention relates to a method of and an apparatus for controlling the supercharge pressure of a turbocharger in which an excessive overshoot condition by the actual supercharge pressure is prevented.

(2) Description of the Prior Art

A turbocharger is constructed in such a manner that an exhaust gas turbine is rotated by exhaust gas, which is at a high temperature and at a high pressure energy so that the pressure within the intake manifold can be increased above atmospheric pressure as the number of rotations or rotational speed of a compressor in the turbocharger increases. As a result, the supply of a large quantity of intake air flow to the engine becomes possible by the supercharge pressure thus obtained, with the result that high torque, high output power and improvement of fuel consumption can be obtained.

Now, in a car engine having a wide range of engine speeds, it is possible to sufficiently secure the supercharge pressure in the middle and high speed operating zones in view of the characteristics of the turbocharger. In the low speed operating zone, however, as it is difficult to obtain a sufficient exhaust pressure, the number of rotations or rotational speed of the exhaust gas turbine can not be increased. As a result, the supercharge pressure is lowered and the torque at low speed will tend to be insufficient. In this case, it is known that the drive efficiency of the exhaust gas turbine is determined in accordance with the ratio of A/R, where A indicates the cross-sectional area of a scroll of the turbine, which is an inlet portion of the exhaust gas entering into the turbine, and R indicates the radius from the center of the scroll.

To this end, a turbocharger of the variable capacity type which has capacity changing means, with the ratio A/R of the turbine being variable, has already been proposed by the same applicant of this application (see, for instance, Japanese Patent Application S.N. 58-162918) in which a supercharge pressure can be obtained even when the turbocharger of the variable capacity type is operated in the low speed operating zone.

The capacity changing means for either increasing or decreasing the opening of the exhaust gas inlet portion to the exhaust gas turbine is driven by an actuator, the working pressure of which is supercharge pressure produced downstream of a compressor. In order to regulate the working pressure, an electromagnetic valve is provided and part of the working pressure is released by the electromagnetic valve to the atmosphere, so as to regulate the pressure. To this end, an electronic control unit including a microprocessor is used and the operation of the electromagnetic valve is controlled by the control unit in accordance with the operating conditions of the engine.

The electromagnetic valve to be utilized in this case, is normally an ON/OFF type electromagnetic valve which operates at a predetermined frequency and its opening time ratio is controlled in accordance with the duty value. For instance, when the duty value representative of the opening time of the valve is 100 percent, it indicates that it is fully opened and the cross-sectional area A is made minimum in this case by means of the actuator and the capacity changing means, so as to increase the rotational speed of the exhaust gas turbine.

On the other hand, when the duty value is zero, it indicates that the electromagnetic valve is fully closed, with the result that the cross-sectional area A is made maximum and the rotational speed of the turbine is suppressed. In actual control of the engine, in order to increase the accuracy of the control, the supercharge pressure is feedback-controlled in accordance with the deviation between the target supercharge pressure and the actual supercharge pressure so as to achieve agreement of the actual supercharge pressure with the target value.

Although a sufficient supercharge pressure can be obtained by the capacity changing means in the low speed operating zone of the engine having a low exhaust gas flow rate, the flow speed of the exhaust gas turbine can not be decreased in a high speed, high load operating zone where the exhaust gas flow rate increases, even when the cross-sectional area A of the scroll is made maximum. As a result, the rotational speed of the exhaust gas turbine increases rapidly and it follows that the rotational speed exceeds its allowable upper limit for the supercharge pressure.

To this end, when the supercharge pressure approaches the upper limit, part of the exhaust gas is bypassed from the upstream of the exhaust gas turbine to the downstream by the provision of an exhaust bypass valve which suppresses the supercharge pressure. Accordingly, when the exhaust bypass valve is opened, the exhaust gas flow into the exhaust gas turbine is decreased, so that the rotational speed of the turbine is also decreased, thus preventing the supercharge pressure from exceeding the upper limit.

In the supercharge pressure control apparatus already proposed by the same applicant of this application, the exhaust bypass valve is also feedback-controlled by detecting actual supercharge pressure as in the case of the capacity changing means, so as to improve the control accuracy of the supercharge pressure. In this case, however, when the capacity changing means and the exhaust bypass valve are both feedback-controlled, it often results in a zone where mutual interference occurs, and the valve of the capacity changing means and the exhaust bypass valve often deviate from their essential optimum valve positions.

For instance, when the supercharge pressure approaches the upper limit in the high speed operating zone of the engine, the capacity changing means is normally fully-opened and there is no reduction in the flow of the exhaust gas, while if the opening of the exhaust bypass valve is adjusted in accordance with the supercharge pressure, the exhaust gas flow is also not increased. As a result, optimum supercharge pressure control can be performed, with the efficiency of the engine operation being maintained in a preferable condition, theoretically. In practice, however, even when the exhaust gas flow speed is increased by reducing the opening of the capacity changing means and the exhaust bypass valve is additionally opened, the same supercharge pressure condition can not be maintained. The reason is that an exhaust gas flow path tends to be unnecessarily reduced by the capacity changing means and this in turn causes the exhaust gas pressure to be increased accordingly, thus lowering the exhaust gas efficiency and lowering the output efficiency as well.

Accordingly, when a feedback control is performed by the capacity changing means and the exhaust bypass valve, a zone to be feedback-controlled is set up in accordance with the operating conditions of the engine. In this case, when any one of the capacity changing means and the exhaust bypass valve is carrying out the feedback control, while the other is maintained constant, any problems occuring from the control interference between the two can be avoided.

Now, in order to increase the acceleration performance of the engine, an over-boost control has already been proposed in which target supercharge pressure is temporarily increased in the accelerated condition so as to keep track of the target supercharge pressure. For the purpose of performing the over-boost control, there are two operations to be carried out in practice; one is to increase the target supercharge pressure when beginning to open the exhaust bypass valve and the other is to increase the flow speed of the exhaust gas by reducing the opening of the capacity changing means at the same time. In the former case, since the rotational speed of the exhaust gas turbine is increased after an increase in the exhaust gas flow rate during engine acceleration, the response for increasing the supercharge pressure is low. On the other hand, in the latter case, the actual supercharge pressure control can promptly be performed as the exhaust gas speed into the exhaust gas turbine is increased.

In this case, however, when the target value of supercharge pressure is increased during acceleration and at the same time when the over-boost control is performed by the capacity changing means so as to rapidly increase the rotational speed of the exhaust gas turbine, the actual supercharge pressure is suddenly increased. However, when the actual supercharge pressure now exceeds the target value, even if an attempt has been made to lower the rotational speed of the turbine, the overshoot phenomena would occur during which the actual supercharge pressure temporarily exceeds the target value largely due to the delay in the operation response of an actuator for driving the capacity changing means.

Accordingly, if the actual supercharge pressure exceeds the upper limit of the target value even if temporarily, excessive air mixed with fuel is supplied into the engine because the target supercharge pressure has been set up at a higher value in the acceleration condition than the normal condition, thus causing a detrimental effect on the durability of the engine due to the excessive load condition.

In order to increase the response described above, when the control gain for the feedback control is increased, a hunting in the control tends to be produced and the control stability lowers.

SUMMARY OF THE INVENTION

It is therefore an object of the present invention to provide a method of and an apparatus for controlling supercharge pressure for a turbocharger in which the above drawbacks can be overcome and the overshoot in the actual supercharge pressure can be prevented although the actual supercharge pressure can be promptly increased during engine acceleration condition.

It is another object of the present invention to provide a method and an apparatus for controlling supercharge pressure for a turbocharger in which actual supercharge pressure can promptly be increased without an excessive overshoot of the actual supercharge pressure during engine acceleration.

It is still another object of the present invention to provide a method of and an apparatus for controlling supercharge pressure for a turbocharger in which the timing for increasing the target supercharge pressure is delayed a predetermined time after the actual supercharge pressure has exceeded a predetermined value during engine acceleration.

It is yet another object of the present invention to provide a method and an apparatus for controlling supercharge pressure for a turbocharger in which the target supercharge pressure is corrected in an increasing direction by a time setting means just after the actual supercharge pressure has exceeded its peak, so as to substantially equalize the actual supercharge pressure to the target supercharger pressure.

It is yet another object of the present invention to provide a method and an apparatus for controlling supercharge pressure for a turbocharger in which a feedback control for the actual supercharge pressure is performed in order to produce of a lower target value of supercharge pressure than a true target value required at the initial period of acceleration so as to avoid an excessive supercharge of the engine and to prevent excessive overshoot from occurring.

One feature of the present invention resides in a method of controlling supercharge pressure for a turbocharger, which comprises the steps of: detecting an acceleration condition from operating conditions of the engine; performing a feedback control by at least capacity changing means when actual supercharge pressure reaches a first predetermined value after the acceleration condition has been determined; starting a correction of a control amount for the acceleration condition at the first predetermined value; and delaying the timing for increasing a final target value a predetermined time until the actual supercharge pressure is gradually decreasing after having been reached to a first target value.

Another feature of the present invention resides in an apparatus for controlling supercharge pressure for a turbocharger, which comprises: a plurality of detecting means for detecting operating conditions of the engine, such as intake air flow rate, supercharge pressure; capacity changing means provided at a guide path of an exhaust pipe and having a shaft member coupled through arm and rod means to a first actuator; an exhaust bypass valve provided at an exhaust manifold and having linkage means including arm and rod means coupled to a second actuator; a first electromagnetic valve provided at a first liaison pipe for controlling said first actuator in accordance with a first control signal having a first control duty; a second electromagnetic valve provided at a second liaison pipe for controlling said second actuator in accordance with a second control signal having a second control duty; and an electronic control unit having a microprocessor including a CPU, a ROM, and a RAM for producing said first and second control signals and for selectively controlling said first and second electromagnetic valves in accordance with the parameters representative of the operating conditions of the engine.

These and other objects, features, and advantages of the present invention will be better understood from the following detailed description of the invention with reference to the attached drawings.

BRIEF DESCRIPTION OF THE DRAWINGS

FIG. 7 is a control flow chart for performing a learning control for the capacity changing means or movable tongue member, according to the present invention, FIG. 8 is a control flow chart for performing a learning control for the exhaust bypass valve, according to the present invention, FIG. 9(A), 9(B) and 9(C) illustrate the characteristics of basic control duty vs. intake air flow rate for the capacity changing means, stored in the ROM of the microprocessor in the electronic control unit in FIG. 2.

DESCRIPTION OF THE PREFERRED EMBODIMENT

Figure 1:
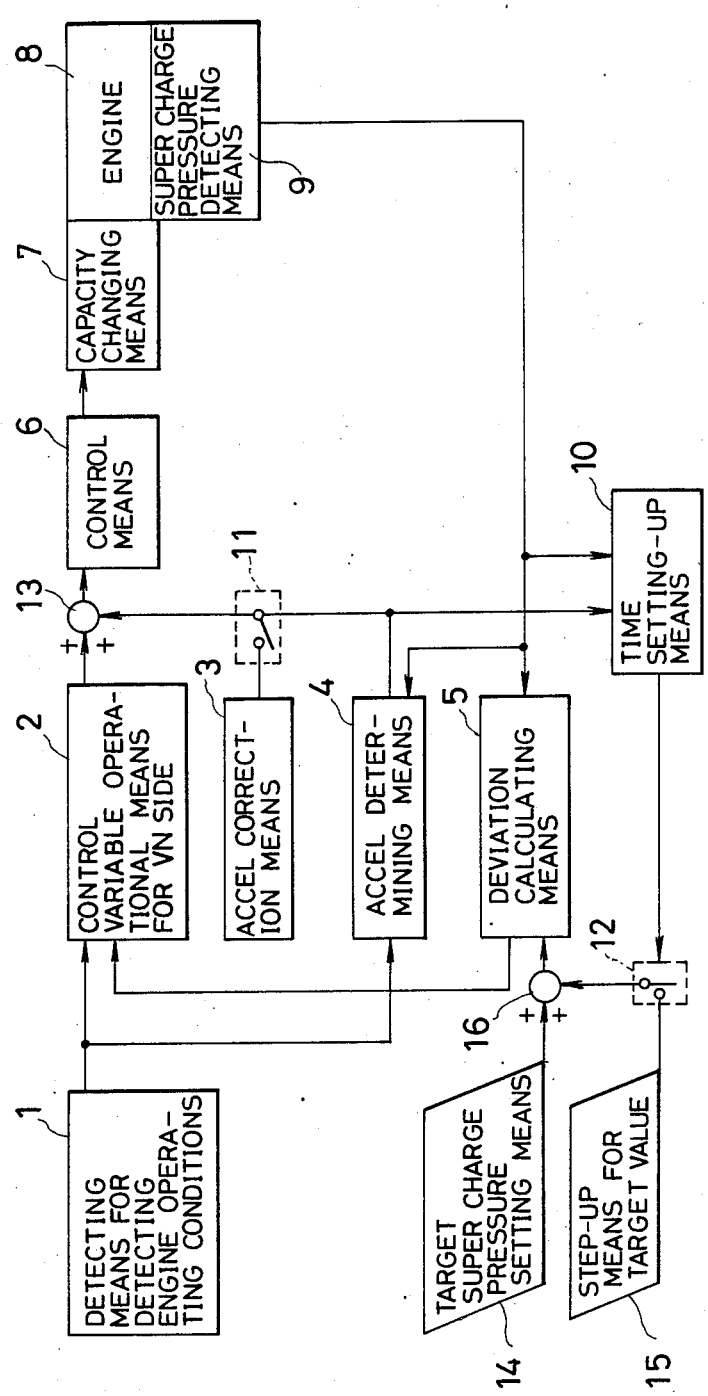
FIG. 1 is a basic concept of the construction of the apparatus for controlling supercharge pressure for a turbocharger, according to the present invention.

FIG. 1 shows a basic concept of the structure of the supercharge pressure control apparatus according to the present invention.

The apparatus comprises detecting means 1 for detecting the operating conditions of the engine such as actual intake air flow rate, engine speed, operational means 2 for calculating a basic control variable for the capacity changing means 2 for calculating a basic control variable for the capacity changing means (VN), correction means 3 for carrying out acceleration correction, determination means 4 for determining an accelerated condition of the engine in accordance with the outputs of the detecting means 1 and means 5 for calculating the deviation between actual supercharge pressure and target value of supercharge pressure.

The apparatus further comprises control means 6, capacity changing means 7, the engine 8, supercharge pressure detecting means 9, means 10 for setting-up time, switching means 11 and 12, adders 13 and 16, target supercharge pressure setting means 14 for producing a target supercharge pressure signal, and step-up means 15 for stepping-up the target supercharge pressure at the accelerated time.

The supercharge pressure detecting means 9 detects the actual supercharge pressure to be supercharged in a compressor (not shown). The operational means 2 calculates the basic control variable for the capacity changing means 7 in accordance with the operating condition of the engine. The control means 6 which constitutes an actuator controls the opening of the capacity changing means (VN) 7 in accordance with the deviation corrected by the correction means through the switching means 11 and the adder 13.

The determination means 4 determines the acceleration condition of the engine 8 in accordance with the outputs from the detecting means 1. The means 4 turns on the switching means 11 when the acceleration condition is detected or determined, so as to add in the adder 13 a corrected variable or amount from the correction means 3 to the basic control variable or amount from the operational means 2 for the capacity changing means (VN).

The time setting-up means 10 energizes the switching means 12 after the elapse of the predetermined time from the time point where the actual supercharge pressure exceeds a preset or target supercharge pressure value after entering into the acceleration condition in order to increase the target supercharge pressure. As a result, when the switching means 12 is energized by the means 10, the target value from the target supercharge pressure setting means 14 is added by the output from the step-up means 14 through the adder 16 and the output from the adder 16 is applied to the means 5 for calculating the deviation.

Accordingly, in the present invention, the target value of supercharge pressure in the acceleration condition is not increased immediately after entering the acceleration condition but is adapted to be performed after the elapse of the preset time.

In the supercharge pressure control apparatus according to the present invention, the control variable or control amount of the capacity changing means 7 is increased in accordance with the output from the acceleration correction means 3 during acceleration, while the over-boost control is performed by increasing the target value of supercharge pressure to be controlled. However, the target value is not increased until a predetermined time is elapsed afterwards even when the actual supercharge pressure exceeds the predetermined value or the set point during the acceleration condition.

Consequently, the actual supercharge pressure is promptly increased in accordance with the correction of acceleration by the capacity changing means 7 and when it reaches the target point or value, a correction is now carried out in the direction to decrease the controlled variable in accordance with the deviation from the deviation calculating means 5. Then, the opening of the capacity changing means 7 is controlled by a feedback control so as to increase the opening. However, the actual supercharge pressure is further increased because of the time delay during the feedback control and afterwards it is decreased. The increase in the actual supercharge pressure is only for a rather low target value and it is not so deviated from the upper limit required in the accelerated condition.

In this manner as described above, just after the actual supercharge pressure has exceeded the peak point, the target value of supercharge pressure to be controlled is corrected in the direction of increase and the actual supercharge pressure is substantially made equal to the target value promptly. As a result, an excessive overshoot phenomena can be prevented from occuring in such a case when the actual supercharge pressure is increased at the same time with the determination of the accelerated condition.

Figure 2:
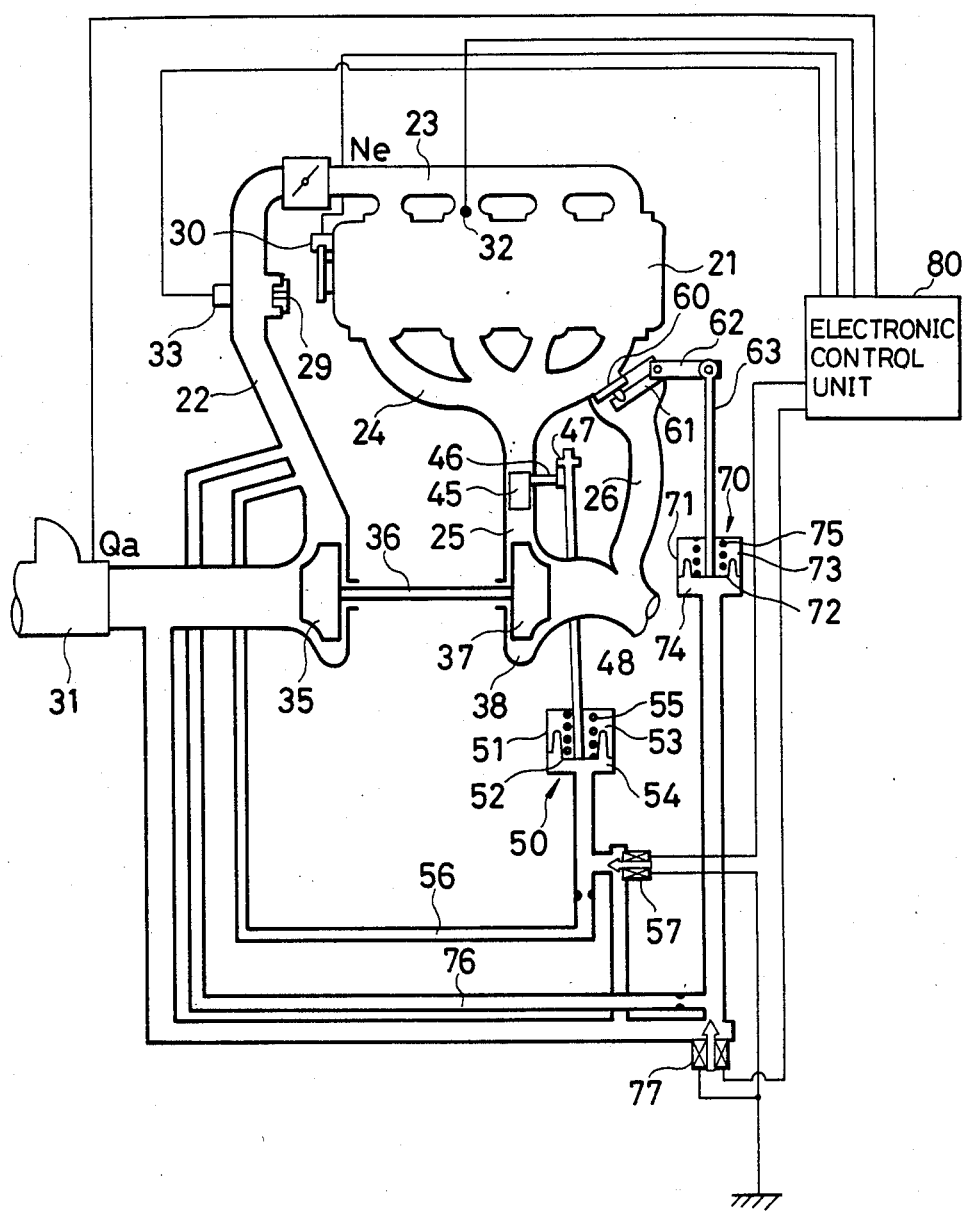
FIG. 2 is an overall engine system having a turbocharger to which the method and apparatus according to the present invention have been applied.

FIG. 2 shows an overall engine system having a turbocharger to which the present invention is applied. In the engine system, air is supplied to an engine 21 through an inlet pipe 22 and an inlet manifold 23 and exhaust gas is discharged through an outlet manifold 24 and an exhaust pipe 25.

At the left end of the inlet pipe 22, there is provided an air flow meter 31 for measuring the inlet air flow rate $Q_A$ and at the opposite side of the inlet pipe 22, there is provided a compressor 35 which constitutes part of the turbocharger, which supplies the intake air supplied through the air flow meter 31 to the engine 21 after pressurizing the air.

Figure 3:
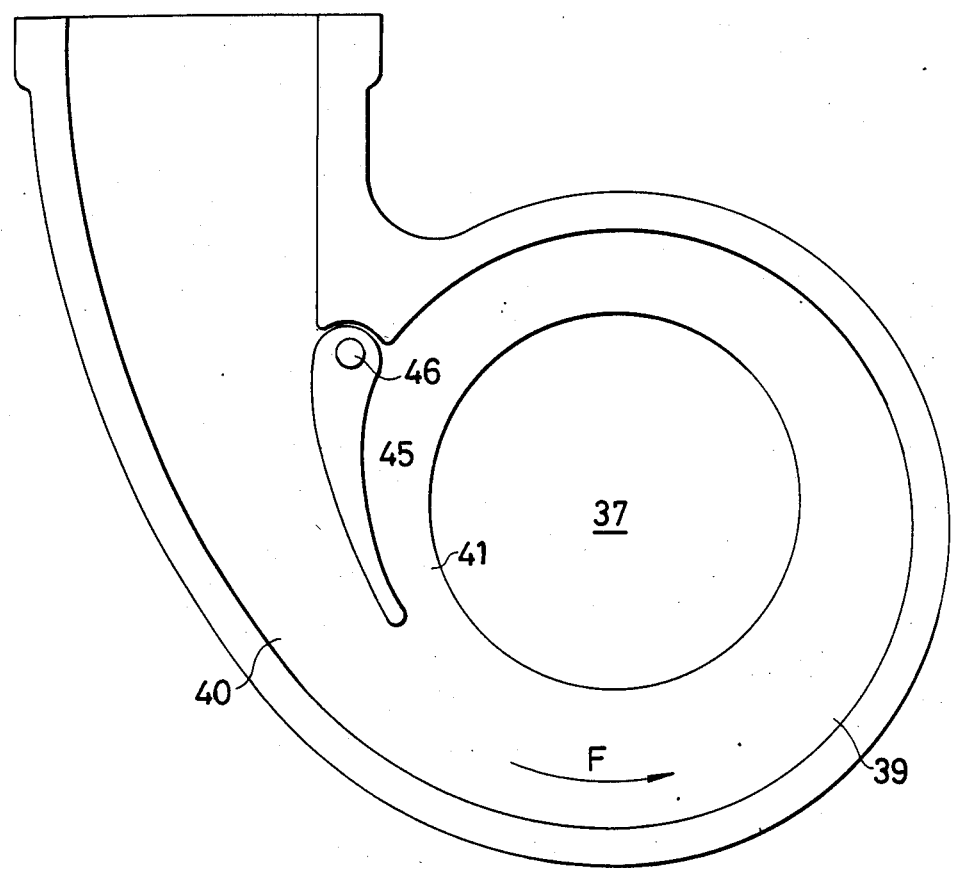
FIG. 3 is an enlarged cross-sectional view of a scroll portion of a turbocharger of FIG. 2.

At the base end portion of the inlet pipe 22 adjacent to the intake manifold 25, there is provided a water temperature sensor 32 while a drain valve 29 is provided between the compressor 35 and the water temperature sensor 32. A turbine chamber 38 is formed at the bottom of the exhaust pipe 25 and a turbine 37 is provided within the turbine chamber 38, which is linked with the compressor 35 by a link shaft 36. The turbine chamber 38 is provided with a scroll 39 surrounding the turbine 37, as shown in FIG. 3. The scroll 39 is formed in such a manner that the cross-sectional area thereof is gradually reduced in a down stream direction from a guide path 40 as shown by the arrow F.

At the confluence of the guide path 40 to the scroll 39 and the terminal end 41 of the scroll 39, there is provided a movable tongue or flap valve member 45 as a capacity changing means. The movable tongue member 45 is pivotally supported by a shaft 46 so as to adjust the cross-sectional area of the guide path 40. The movable tongue member 45 is provided within the exhaust pipe 25 in the figure near upstream of the guide path 40 in the turbine 37. The shaft 46 pivotally supporting the movable tongue member 45 is linked to the upper end of a rod 48 through an arm 47 and the lower end of the rod 48 is linked to a diaphragm 52 which constitutes an actuator 50 for driving the movable tongue member 45.

A housing 51 having the diaphragm 52 is divided by the diaphragm 52 into an atmospheric chamber 53 and a positive pressure chamber 54. The atmospheric chamber 53 is provided with a spring 55 which is urged so as to push the diaphragm 52 toward the positive pressure chamber 54. The positive pressure chamber 54 is communicated with the inlet pipe 22 located downstream of the compressor 35 through a liaison pipe 56, so that the supercharge pressure produced by the compressor 35 is supplied to the positive pressure chamber 54 and it pushes the diaphragm 52 to the atmospheric chamber 53 against the spring 55.

Moreover, an electromagnetic valve 57 is provided between the inlet pipe 22 and the liaison pipe 56, which is, when operated, to be opened by a control signal from an electronic control unit 80, and the liaison pipe 56 is communicated with the atmosphere through the electromagnetic valve 57. As a result, the pressure within the positive pressure chamber 56 is lowered. Specifically, since the electromagnetic valve 57 is duty-controlled by the electronic control unit 80 in such a manner that the larger the duty valve becomes, the more the degree of opening of the electromagnetic valve 57 increases, thus lowering the pressure in the positive pressure chamber 54. Accordingly, the diaphragm 52 is moved downward by the action of the spring 55 in the atmospheric chamber 53 and this movement is transmitted to the movable tongue member 45 through the rod 48, the arm 47 and the shaft 46, thus permitting the movable tongue member 45 to be pivoted in the direction of reducing the guide path 40 for the exhaust gas to the turbine 37, i.e., in the direction of closing the guide path 40. As a result, the flow speed of the exhaust gas to be supplied to the turbine 37 increases and the supercharge pressure of the compressor 35 to the engine 21 also increases.

On the other hand, the smaller the duty value becomes, the more the degree of opening of the electromagnetic valve 57 decreases and in turn the pressure in the positive pressure chamber 54 increases and then the diaphragm 52 is moved upward against the force of the spring 55, thus permitting the movable tongue member 45 to make a pivotal movement in the direction of opening the guide path 40. As a result, the flow speed of the exhaust gas to be supplied to the turbine 37 decreases and the supercharge pressure by the compressor 35 to the engine 21 also lowers.

An exhaust bypass valve 60 is provided at the junction between an exhaust bypass path 26 for bypassing the turbine 37 and the exhaust manifold 24. The exhaust bypass valve 60 is linked to one end of a rod 63 through an arm 61 and a linkage member 62, and the other end of the rod 63 is linked to a diaphragm 72 in an actuator 70 so as to drive the bypass valve 60. A casing 71 having the diaphragm 72 is divided into an atmospheric chamber 73 and a positive pressure chamber 74 by the diaphragm 72. The atmospheric chamber 73 is provided with a spring 75 which is urged so as to push the diaphragm 72 toward the positive pressure chamber 74. The positive pressure chamber 74 is communicated with the inlet pipe 22 at downstream of the compressor 35 through a liaison pipe 76 and the supercharge pressure produced by the compressor 35 is supplied to the positive pressure chamber 74.

Another electromagnetic valve 77 is provided at a liaison pipe 76 and when the electromagnetic valve 77 is opened by a control signal from the control unit 80, the liaison pipe 76 is communicated with the atmosphere through the electromagnetic valve 77, thus lowering the pressure within the positive pressure chamber 74. More specifically, the electromagnetic valve 77 is duty-controlled by the electronic control unit 80, so that the larger the duty valve thereof becomes, the more the degree of opening of the electromagnetic valve 77 increases. As a result, the pressure in the positive pressure chamber 74 lowers and the diaphragm 72 is moved downward by the action of the spring 75 within the atmospheric chamber 73. This downward movement of the diaphragm 72 is transmitted to the exhaust bypass valve 60 through the rod 63, the linkage member 62, and the arm 61 and the valve 60 is operated in the direction of closing the bypass path 26.

On the other hand, the smaller the duty valve becomes, the smaller the degree of opening of the electromagnetic valve 77 becomes so that the pressure in the positive pressure chamber 74 increases. As a result, the diaphragm 72 is moved upward against the spring 75 and the upward movement of the diaphragm permits the exhaust bypass valve 60 to be operated in the direction of opening. The function of the valve 60 is to prevent the engine 21 from being damaged due to the excessive increase in the intake supercharge pressure to be supplied to the engine 21 when the engine 21 operates in a high speed, high load condition. To this end, part of the exhaust gas from the engine 21 is discharged to outside and a suitable supercharge pressure is introduced into the engine 21 by reducing the exhaust gas to be supplied to the turbine 37.

The electronic control unit 80 comprises a microprocessor including a central processing unit (CPU), a random access memory (RAM), and a read-only memory (ROM) different timers such as TA, TB, TL, TP and TM, and A/D converter, and an input/output interface (all are not shown). The detected signals from the air flow meter 31, the crankangle sensor 30, the water temperature sensor 32, and the supercharge pressure sensor 33 are applied to the control unit 80 and they are converted into digital data corresponding to the intake air flow rate $Q_A$, the engine speed Ne, the throttle valve opening $\theta$, and the actual supercharge pressure P through the A/D converter in the control unit in the well-known manner.

The microprocessor, not shown, in the control unit 80 calculates each of suitable duty values of control signals to be applied to the electromagnetic valve 57 and 77 for driving the same, in accordance with the detected signals. As the result of controlling the electromagnetic valves 57 and 77, the exhaust bypass valve 60 is controlled and the cross-sectional area of the guide path 40 for the exhaust gas to the turbine 37 can be changed, while the amount of the exhaust gas to the turbine 37 is changed by the control of the exhaust bypass valve 60. By these actions, the intake supercharge pressure to be supplied to the engine 21 is suitably controlled in response to the intake air flow rate QA, thus increasing the torque from the low speed operating zone to the high speed operating zone.

FIGS. 4(A) to 8 show control flow charts for controlling the movable tongue member 45 as the capacity changing means and the exhaust bypass valve 60, through the electronic control unit 80 (see FIG. 2) having the microprocessor. In these figures, the movable tongue member 45 is indicated by VN and the exhaust bypass valve 60 indicated by WG.

As is well known in the art, various data such as target or preset engine speed, preset supercharge pressure, preset intake air flow rate are all stored in the ROM, while detected data concerning the operating conditions of the engine such as actual engine speed, actual supercharge pressure, actual intake air flow rate, are normally stored in the RAM temporarily.

Figure 4A:
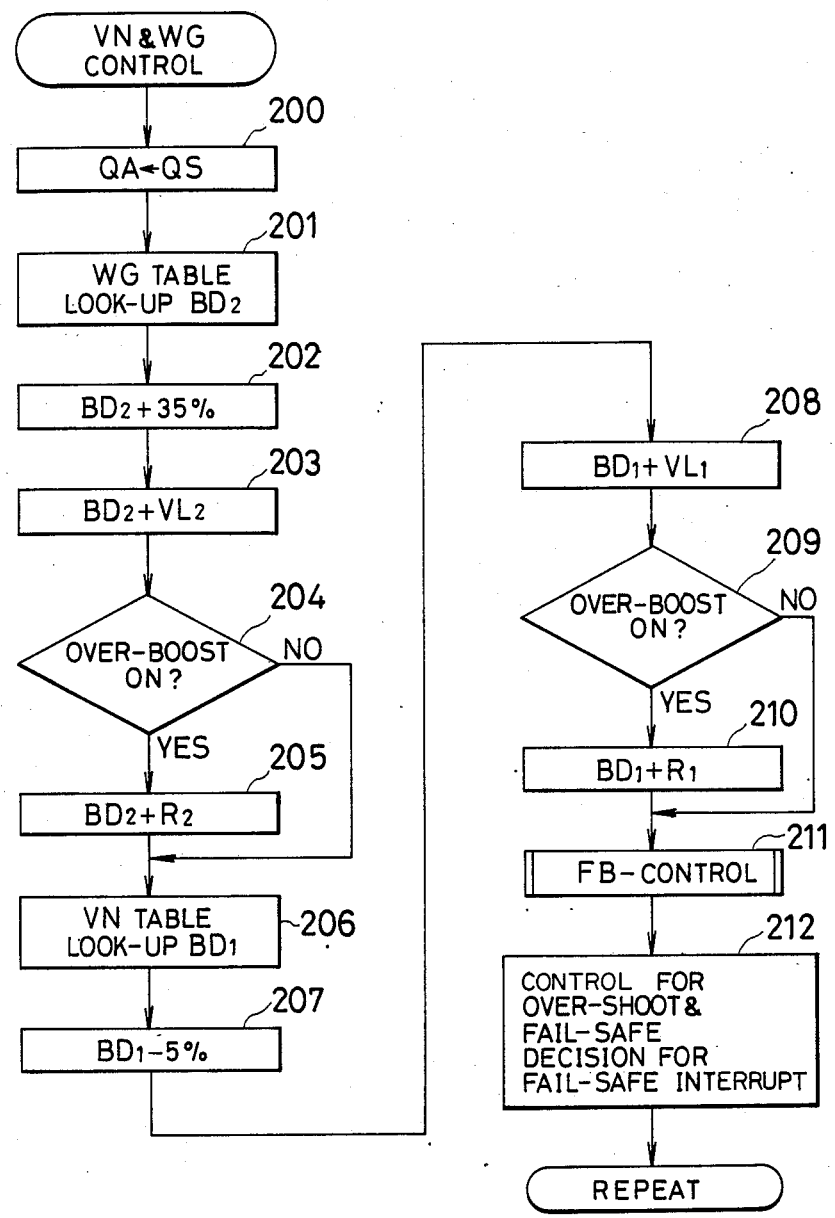
FIGS. 4(A) and 4(B) illustrates a control flow chart for controlling capacity changing means and exhaust bypass valve means and a control flow chart for performing an over-boost control through the electronic control unit shown in FIG. 2, according to the present invention.

In FIG. 4(A), operations and calculations for the supercharge pressure control by VN and WG are performed at each predetermined control time period, so as to achieve agreement between the preset supercharge pressure $P_{set}$ and the actual supercharge pressure P in accordance with the operating conditions of the engine. After starting the operation, air flow index $Q_S$ is sought from intake air flow rate $Q_A$ in step 200. In the actual control, this air flow index $Q_S$ is used as data for calculation. However, in the following explanation, $Q_S$ is used as the intake air flow rate $Q_A$.

In step 201, a basic control duty $BD_2$ for WG is read from a look-up table and a value of 35% of the basic control duty value is added to the basic control duty $BD_2$ in step 202. This value is selected for the purpose of correcting the controlled variable so as to prevent an erroneous opening of WG from occurring due to dispersions of a setting value for WG and of parts of the system. In step 203, a learning amount $L_2$ obtained from a learning control is added to the basic control duty $BD_2$ in step 203 so as to cancel a constant deviation which occurs in the feedback control system.

In step 204, a decision is made if an over-boost control is performed so as to improve acceleration performance by temporarily increasing the supercharge pressure P during a sudden accelerated condition. If the result of the decision in step 204 is YES, that is, the over-boost control is performed, the operation now moves to step 205, where the acceleration correction amount $R_2$ for the overboost control is added to the basic control duty $BD_2$. An up-to-date learnt amount $VL_2$ and the acceleration correction amount $R_2$ are the ones for imparting a feedforward control amount for WG. The calculation of the learnt amount $VL_2$ and the over-boost control will be described later.

In steps 206 to 210, the feedforward control amount for VN is sought from a look-up table as a basic control duty $BD_1$. The steps 201 to 210 are almost same as the steps 206 to 210, except for the subtraction of 5 percent for the basic control duty $BD_1$ sought from the look-up table in step 207. This subtraction of 5 percent is a correction amount R, for preventing WG from being opened when VN is displaced in the direction of closure due to any displacement or shifting of the basic control duty of VN and the dispersions of parts used.

In step 208, an up-to-date learnt amount $VL_1$ is added to the basic control amount $BD_1$, similar to the WG side. The calculation of the learnt amount $VL_1$ will be explained later.

Since each characteristic of the basic control duties VN and WG is known, for instance, as shown in FIGS. 9(A) and 9(B), and the corresponding data have preliminarily been stored in the ROM as shown in FIG. 9(C), the basic control amounts $BD_1$ and $BD_2$ of VN and WG can be sought from a look-up table. FIG. 9(C) shows only the table look-up data for VN, in the form of Hexadecimal bits H.

In step 211, a feedback correction amount is calculated against the deviation of the actual supercharge pressure P from the target or preset supercharge pressure $P_{set}$ and then the feedback correction amount is further added to the feedforward control amount previously obtained, so as to calculate each of the final control amounts $OUT_1$ and $OUT_2$ of control signals from the $BD_1$ and $BD_2$. This feedback control about the actual supercharge pressure P to be carried out in step 211 will be explained later.

In step 212, a processing for prevention of overshoot phenomena in the initial period of the sudden accelerated condition and a fail-safe operation at the time of failure in the constructing parts, are carried out.

Figure 15:
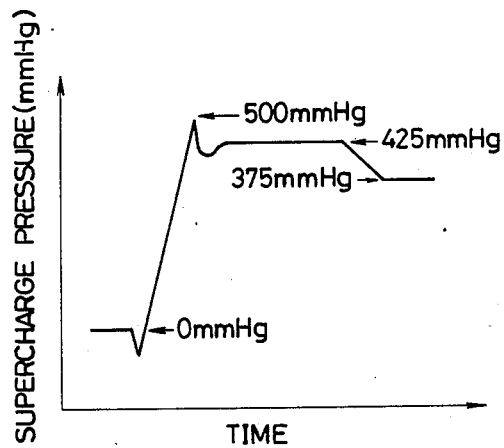
FIG. 15 shows an overshoot condition of the actual supercharge pressure with the time elapsed.

Namely, the supercharged pressure is abruptly increased when vehicle is suddenly accelerated. However, since the increase in the supercharge pressure is fast in the turbocharger having VN, as compared with a normal turbocharger, an overshoot is produced as shown in FIG. 15. In the example shown in FIG. 15, the supercharge pressure often tends to go beyond 500 mmHg during the overboost control, which would result in the damage in the engine durability. In order to prevent this, the duty of the control signal for WG is temporarily reduced in the initial period of the suddenly accelerated condition, while bypassing the turbine 37, so as to increase the exhaust gas flow to be drained, thus lowering the supercharge pressure.

Figure 11:
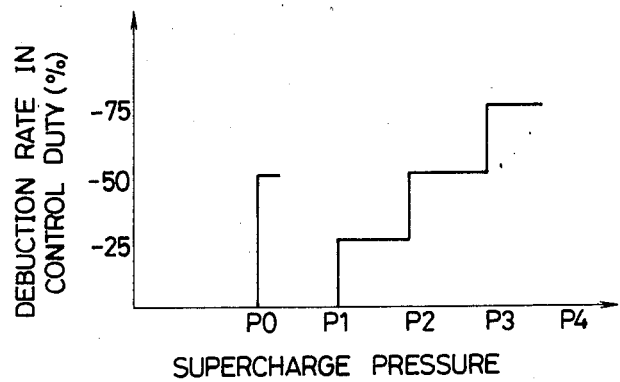
FIG. 11 is the characteristic of reduction in the control duty vs. supercharge pressure, to be used in the present invention.

More specifically, the duty correction for controlling WG can be carried out by the supercharge pressure as shown in FIG. 11, as follows; When the actual supercharge pressure P is increased due to the sudden acceleration, the control duty for WG is reduced by 50 percent at a time point where the actual supercharge pressure P exceeded a predetermined supercharge pressure $P_{set}=P_o$. In this case, however, if the predetermined supercharge pressure $P_{set}=P_o$ is set up at a small value, e.g., at 375 mmHg in order to prevent the overshoot from occuring, the actual supercharge pressure is lowered afterwards. Accordingly, it is preferable to reduce the control duty at about 0.3 seconds after the actual supercharge pressure reaching the predetermined supercharge pressure $P_o$.

After the elapse of 0.3 seconds, the normal fail-safe operation is performed so as to correct the control duty for WG by gradually reducing the actual supercharge pressure from $P_1$ to $P_3$ ($>P_o$) stepwise.

By taking into consideration of the exhaust gas valve WG not being opened, a fail-safe release request flag $FL_3$ is set so as to release the fail-safe operation in the engine control system when the actual supercharge pressure remains exceeding $P_4$ point.

The control duties for WG and VN thus finally obtained are stored in the RAM and then produced from the electronic control unit 80 for supplying to each of the electromagnetic valves 77 and 57, as control signals. When the overshoot prevention or fail-safe operation is needed, the control signal $OUT_1$ and $OUT_2$ are corrected by their associated factors, respectively.

Figure 5A:
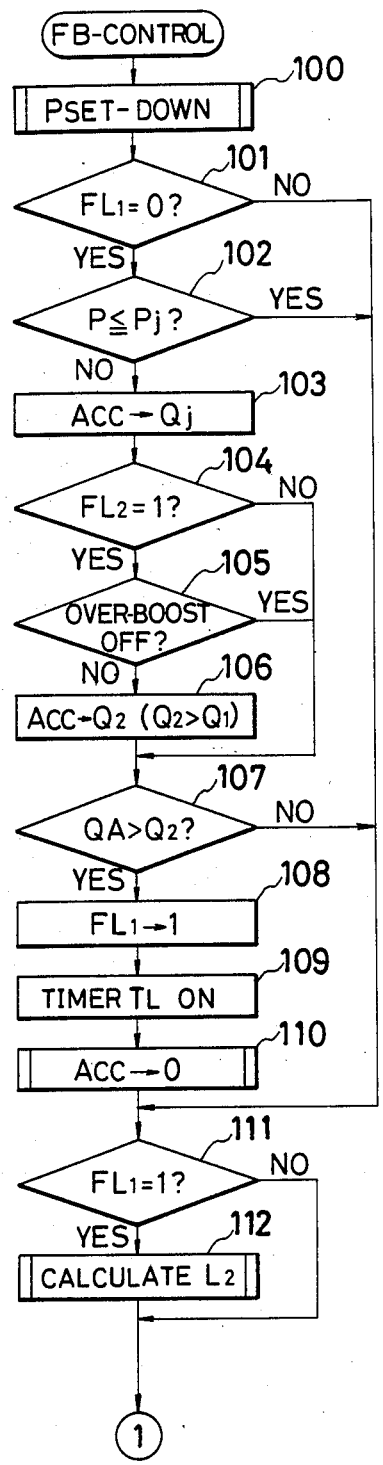
FIG. 5(A) and 5(B) is a detailed control flow chart of the feedback control performed in step 211 in FIG. 4(A), according to the present invention.
Figure 5A:
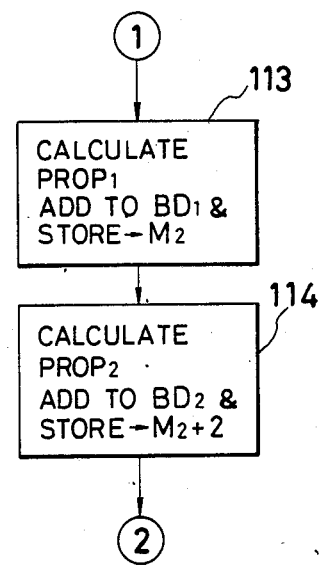
Figure 5B:
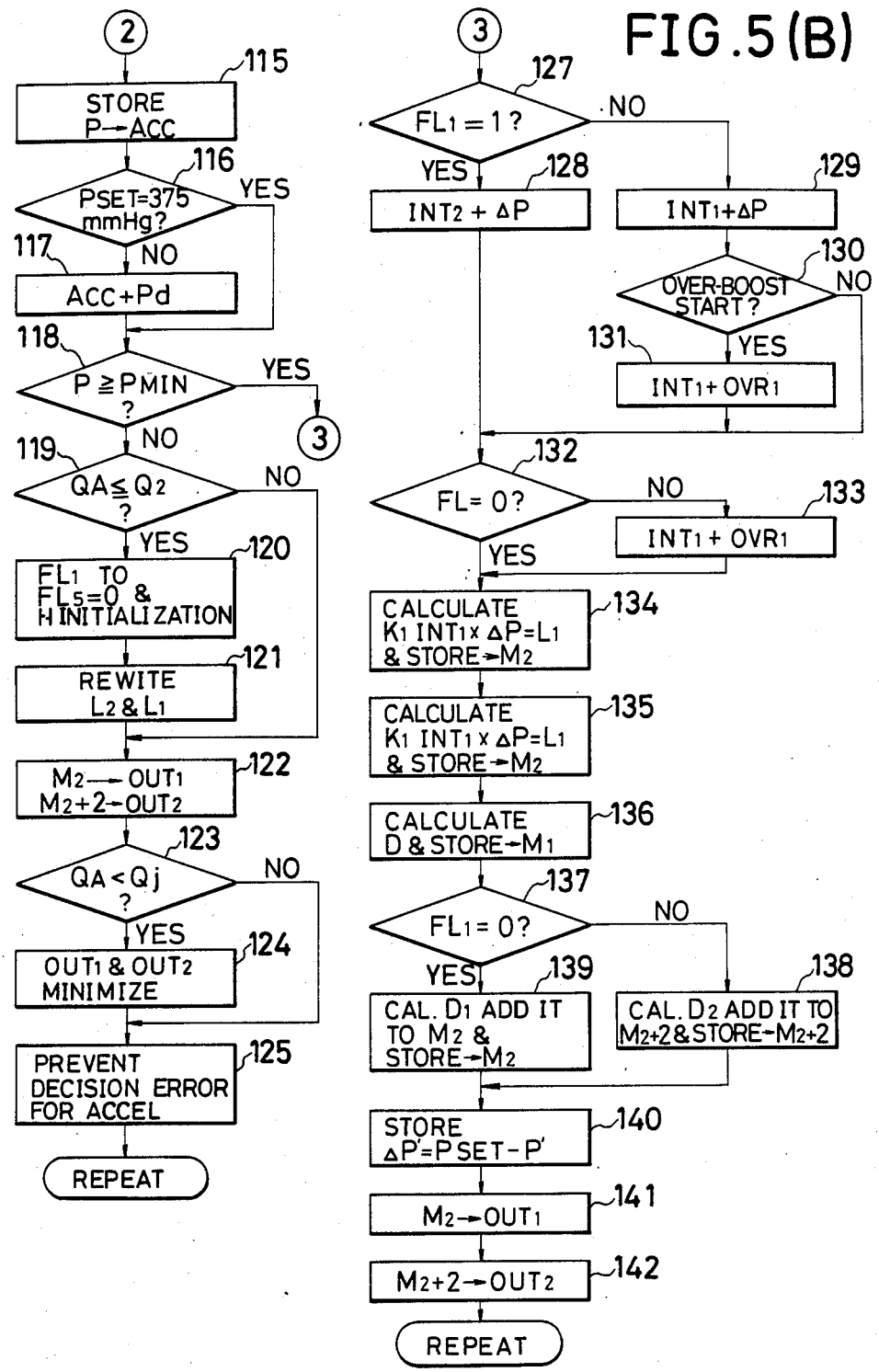

A detailed explanation of the subroutine 211 of the feedback control to be carried out in step 211 will now be made, with reference to the control flow chart, shown in FIG. 5. In this step 211, various operations are performed such as, for instance, a decision is made in which of the operation zones, VN or WG, the feedback control should be performed, calculations of the feedback correction amounts and the learning amounts are carried out and the control amounts thus finally obtained are temporarily stored in the RAM.

Figure 10A:
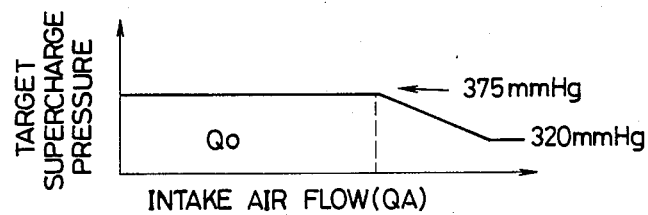
FIG. 10(A) is the characteristic curve of intake air flow rate vs. target supercharge pressure to be used in the present invention.

In step 100, the target or preset supercharge pressure $P_{set}$ is lowered so as to avoid abnormal combustion when the intake air flow is increased. For instance, since the data corresponding to the characteristics in FIGS. 10(A) and 10(B) have preliminarily been stored in the ROM of the microprocessor, when the actual intake air flow rate $Q_A$ becomes above a predetermined intake air flow rate $Q_{set}$, the preset value is gradually lowered.

In step 101, a decision is made in which of the control zones, VN or WG, the feedback control is being performed from the control flag $FL_1$. If the result of the decision is $FL_1$="1", i.e., the control flag $FL_1$ is "1", it means that the feedback control is being applied to WG, the operation moves to step 111. However, if the result of the decision in step 101 is $FL_1$="0", it means that the control is being applied to VN and the operation now moves to the steps starting from step 102, where another decision of the operation zones to be feedback controlled and other calculations of the learning amount, etc, are carried out.

Namely, in step 102, a decision is made if the actual supercharge pressure P is equal to or smaller than a decision supercharge pressure $P_j$, e.g., 230 mmHg for determining the operation zone to be feedback-controlled. If the result of the decision is No, i.e., $P>P_j$, the operation moves to step 111 without determining any operation zones to be controlled. This operation is done for preventing the feedback control from being switched to the WG side before entering the over-boost control after the determination of the sudden accelerated condition of the vehicle which will be explained below.

That is, in the over-boost control, the decision for the sudden accelerated condition is made from the comparison of the accelerated time $\tau$ from change in the actual supercharge pressure from 100 mmHg to 200 mmHg, with a decision reference time $T_j$. If the result of the comparison is that the accelerated time $\tau$ is below the decision reference time $T_j$, it is considered as being in the sudden accelerated condition. In this case, the situation is similar to the case where a determination of the operation zone is made when the actual supercharge pressure P is below the preset supercharge pressure $P_{set}$ so as to try to carry out the operation zone determination.

However, in order to achieve this, it is required that the actual intake air flow rate $Q_A$ is compared with a predetermined decision intake air flow rate $Q_j$ for determining the feedback control zone, other than the determination for the sudden accelerated condition. Consequently, this would result in the condition that the feedback control is switched from the VN side of the WG side, regardless of the decision of the sudden accelerated condition of the vehicle, before the over-boost control is performed so as to increase the response when the sudden accelerated condition is detected. This occurs, because when the intake air flow rate becomes larger than the predetermined intake air flow rate $Q_j$ it is determined that the control is performed in the WG side control zone. As a result, it is no longer possible to perform the over-boost control. For the purpose of preventing this situation, when the actual supercharge pressure P is below the predetermined valve of decision supercharge pressure $P_j$, no decision will be made for the operating zone.

In step 103, the preset or decision intake air flow rate $Q_j=Q_1$, for determining the feedback control zone is set at a register ACC of the microprocessor. It is a very condition for the change-over of the feedback control from the VN side to the WG side, when the actual intake air flow rate $Q_A$ exceeds the decision intake air flow rate $Q_j$. This decision intake air flow rate $Q_j$ corresponds to the line $Q_1$ in FIG. 14. Namely in FIG. 14, the left side zone from the line $Q_1$ indicates the VN control zone while the right side zone from the line $Q_l$ indicates the WG control zone.

In step 104, a decision is made if it is in the suddenly accelerated condition. If the result of the decision is YES, that is, the flag $FL_2$ is set at "1", the operation goes to step 105 as it is in the suddenly accelerated conditon (detailed explanation of the flag $FL_2$ for determining the suddenly accelerated condition will be made later).

On the other hand, however, if the result of the decision is No, the operation moves to step 107 as it is not in the suddenly accelerated condition.

In step 105, another decision is made if the over-boost control is terminated. If the result of the decision is No, that is the over-boost control is being performed, the operation now moves to step 106. However, if the result of the decision is YES, i.e., the over-boost control is terminated, the operation now moves to step 107.

In step 107, the actual intake air flow rate $Q_A$ is compared with a predetermined intake air flow rate $Q_j = Q_2$ stored in the register ACC for determining the operating zone. If the result of the determination is that the intake air flow rate $Q_A$ is larger than the predetermined air flow rate $Q_2$, the operation moves to the step 108 as the control is not being carried out in the VN zone.

Figure 14:
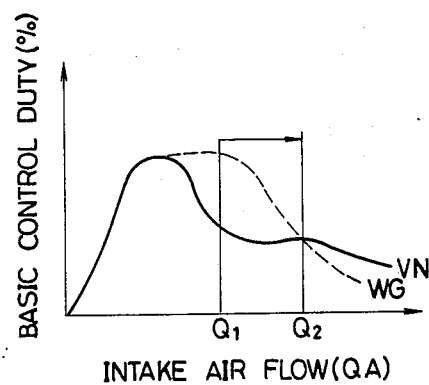
FIG. 14 illustrates the control zones due to the capacity changing means and the exhaust bypass valve, according to the present invention.

In step 108, a decision is made if the flag $FL_2$ indicative of the control zones of either the VN side or WG side is set at "1". This indicates that the control which had been performed in the VN side control zone, with the flag $FL_1 = 1$, has now been switched to the WG zone and the operation now goes to step 109. In step 109, a timer $T_L$ for starting the learning control of the WG is operated and the operation moves to step 110, where the learning amount calculation for the VN side is carried out. This learning amount calculation will be explained later. In step 111, the condition of the flag $FL_1$ is determined. If the result of the determination is $FL_1 = "0"$, the operation moves to step 113. However, if the result of the determination is $FL_1 = "1"$, the operation now goes to step 112, where the learning amount calculation for WG is performed. In such a manner as described above, the determinations of operating zones to be feedback controlled as shown in FIG. 14, as well as the learning amount calculations for either VN or WG are performed.

The operations after step 113, each feedback correction amount calculation for VN or WG is carried out. Here, proportional, integral and differential controls will be described, with the proportional portion, integral portion, and differential portion which are calculated from a deviation being abbreviated as PROP portion, INT portion, and D portion, respectively.

In step 113, the PROP portion for VN is firstly calculated and it is added to the basic control duty $BD_1$ previously obtained. The result of the addition is stored in a location M2 in the RAM. the calculation of the $PROP_1$ portion is carried out as follows, by taking consideration of the stability of the control and possible deviation of the basic control duty $BD_1$. Namely, supposing that the $PROP_1$ portion for VN is $K.PROP_1 \times (\Delta P)^2$, where $K.PROP_1$ indicates operational gain and $\Delta P$ indicates the deviation between the actual supercharge pressure P and the preset supercharge pressure $P_{set}$, i.e., $\Delta P = P_{set} - P$. After this calculation, the operation moves to step 114.

Figure 13:
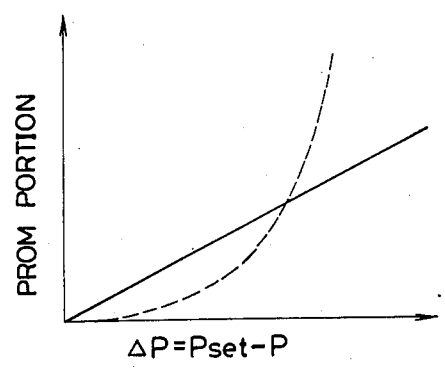
FIG. 13 is the characteristics of the proportional portion vs. the deviation between actual and target supercharge pressures.

In step 114, the $PROP_2$ portion for WG is calculated and it is added to the basic control duty $BD_2$ previously obtained. The result of the calculation is stored in the memory location $M2 + 2$, in a similar manner to the calculation for the VN side. In this case, the $PROP_2$ portion for WG is indicated $K.PROP_2 \times (\Delta P)^2$, where $K.PROP_2$ indicates the operational gain for WG. In FIG. 13, the $PROP_1$ portion for VN is indicated by a dotted line, while the $PROP_2$ portion for WG is indicated by a solid line.

The PROP portion for either VN or WG thus obtained from the feedback control is always added to the basic control duty, respectively. However, as the integral and differential control is performed in the control zone above a predetermined supercharge pressure, in the following steps 115 to 118 a decision is made if the integral plus differential control should be performed.

Firstly, in step 115, the actual supercharge pressure P is stored in the register ACC and the operation moves to step 116, where a decision is made if the target supercharge pressure $P_{set}$ is set at 375 mmHg. If the result of the decision is 375 mmHg, the operation now moves to step 118. However, if the result of the above decision is NO, i.e., the $P_{set}$ is below the predetermined value of 375 mmHg, the operation moves to step 117, where a $P_d$ is added to the content of the register ACC. This is done for the reasons described below. When the actual supercharge pressure P normally reaches $P_{min} = 320$ mmHg, a decision to be made in the next step, i.e., step 118 will be that the integral plus differential control is possible. However, in step 100, when a high intake air flow rate causes the supercharge pressure to be lowered, such a decision is to be made that the control from a lower supercharge pressure is possible. In other words, in a lower intake air flow zone aiming at the target supercharge pressure of 375 mmHg, a decision is made for the control zone, where the integral plus differential control should be performed from the comparison of the actual supercharge pressure P, with the preset supercharge pressure $P_{min}$ (=320 mmHg) for decision. However, in a high intake air flow zone where the target supercharge pressure lowers below 375 mmHg, it is preferable to decrease the preset supercharge pressure $P_{min}$ for the decision, so as to secure the control zone where the integral and differential control should be performed. To this end, the actual supercharge pressure P stored in the register ACC may be compared with the value $P_d$ subtracted from the $P_{min}$ in a predetermined value. However, the same result can be also obtained from the comparison of the $P_{min}$ with a value in which the predetermined value $P_d$ has preliminarily been added to the actual supercharge pressure P. The predetermined value in this case corresponds to $P_d$ which may be a constant or may be changed in accordance with the intake air flow rate $Q_A$.

In step 118, a decision is made if the content of ACC is above the $P_{min}$. If the result of the decision in step 118 is YES, that is, the content of the register ACC is above the $P_{min}$, the operation moves to step 127 as the integral plus differential control is possible. In this case, $P_{min}$ is set up at a lower preset supercharge pressure than the target supercharge pressure $P_{set}$, so that when the actual supercharge pressure P exceeds the value $P_{min}$, the integral feedback control for VN is started.

However, if the result of the above decision is NO, that is, the content of ACC is below the $P_{min}$ and the integral plus differential control is not possible, the operation moves to step 119, where another decision is made. Namely, in step 119, a decision is made if the actual intake air flow rate $Q_A$ is below a predetermined intake air flow rate $Q_2$. If the result of the decision is YES, the operation now moves to step 120, where various control flags are reset and the initialization for control variables are carried out and in the next step, i.e., step 121, rewriting of the learning amounts $L_1$ and $L_2$ for both VN and WG are performed. In other words, it is the change-over condition of the control from the WG side to the VN side as well as initialization of the feedback control variables when the actual supercharge pressure P is smaller than the value $P_{min}$ and the actual intake air flow rate $Q_A$ is smaller than the predetermined intake air flow rate $Q_2$. Accordingly, if the result of the decision in step 119 is NO, that is, the actual air flow rate $Q_A$ is larger than the predetermined air flow rate $Q_2$, the operation goes to step 122. In order to avoid the reseting of the above control flags and the initialization of the control variables, the actual supercharge pressure is instantaneously lowered when the high intake air flow zone. Namely, during the full accelerated condition at the high intake air flow zone, when the operation of the accelerator is returned, there often occurs a case where the decrease in the intake air flow rate is slower than the decrease in the supercharge pressure. In this case, the intake air flow rate is maintained high and the actual supercharge pressure becomes smaller than the $P_{min}$ in spite of the fact that the control is being performed in the WG side. Accordingly, if the initialization of the control variables as well as the reset of the control flags are to be carried out in this case, the integral value $INT_2$ of the deviation for WG obtained till previously will be lost and the control amount for WG will be also decreased, thereby resulting in the deviation of the control when any dispersion of the parts used exists. Accordingly, the reset of the control flags are not carried out in this case.

In step 122, each of the values which is the addition of each correction amount to the basic control duty and which has been stored in the memory locations of M2, M2 +2 respectively is transferred to the same memory locations as $OUT_1$ and $OUT_2$. Since the upper limit and the lower limit values are provided when storing the values, each of the control amounts is restricted within the limits.

In step 123, another decision is made if the actual intake air flow rate $Q_A$ is below the predetermined decision intake air flow rate $Q_j$. If the result of the decision is YES, the operation moves to step 124, where the control duties $OUT_1$ and $OUT_2$ are minimized, respectively. This operation is done for increasing durability of the engine without operating the electromagnetic valves 57 and 77 in the low intake air flow condition during the idling condition.

In step 125, a prevent operation for a misdecision for the accelerated condition is carried out, the detailed explanation of which will be explained later in the acceleration decision operation. After this operation, the operation now moves to step 212.

If the result of the decision in step 118 is that the integral plus differential control is possible in the particular control zone in question, the operation is to move to step 127. In subsequent steps after this step 127, each of the control amounts for both VN and WG is calculated in accordance with the results of the decisions to be carried out in steps 101 through 106 which determine if the control is being performed either on the VN side or on the WG side.

First of all, in step 127, a decision is made if the control flag $FL_1$ is set at "1". If the result of the decision is YES, i.e., $FL_1 = 1$, the operation moves to step 128, where the integral value $INT_2$ of the deviation $\Delta P$ for WG obtained till previous time is added to the deviation $\Delta P^1$ at this time.

On the other hand, if the result of the above decision is NO, i.e., the control flag is $FL_1 = $ "0", the operation now moves to step 129, where the integral value $INT_1$ of the deviation $\Delta P$ obtained until previous time for VN is added to the deviation $\Delta P^1$ at this time. After this operation, it now moves to step 130, where a decision is made if the over-boost control has been started. If the result of the decision in step 130 is YES, the operation moves to step 131, where the correction amount $OVR_1$ during the over-boost control is added to the integral value $INT_1$. This operation is done, for the purpose of adding the feedforward control amount corresponding to an increment in the target value during the overboost control thereto.

If the result of the above decision is that the over-boost control has not been started, the operation moves to step 132, where the control flag $FL_1$ is checked if $FL_1 = $ "1". If the result of this decision is YES, that is, $FL_1 = 1$, the operation now moves to step 133 as the control should be performed on the WG side. In step 133, the integral value $INT_1$ of the deviation $\Delta P$ is subtracted by a predetermined value. After the feedback control is switched from the VN side to the WG side, the control amount for VN is to be gradually subtracted from the control amount just before the changing-over.

This operation is done because if the control amount for VN is maintained at the control amount just before the changing-over, even after the feedback control has been switched to the WG side, the exhaust gas flow speed at the guide path 40 becomes fast as the exhaust gas flow is increased, thus lowering the exhaust gas pressure. As a result, the lowering in the pressure causes the movable tongue number 45 to make a pivotal movement in the direction of the closure of the guide path 40, which would result in the lowering of the capacity of the turbocharger.

On the other hand, if the predetermined value is subtracted from the integral value $INT_1$ of the deviation $\Delta P$ on the VN side, the movable tongue number 45 is pivoted in the direction of opening of the guide path 40 to the fully opened condition. As a result, a sufficient exhaust gas flow can be secured even entering into the WG side control, thus enabling maximum turbocharger performance to be demonstrated.

Returning to the result of the decision in step 132, if the result of the decision is NO, i.e., the control flag is $FL_1 = $ "0", the operation moves to step 134, where the integral portion of the control is calculated from $K''INT_1 \times \Delta P$ and the result is added to the content of M2. Here, K-$INT_1$ indicates the operational integral gain. At the same time, the integral portion for the learning control amount is stored in the RAM as the learning amount $L_1$ at this time for VN. After this calculation, the operation now moves to step 135, where the INT portion for WG is calculated from K $INT_2 \times \Delta P$ and its result is added to the content of M2 +2. Here, the constant K $INT_2$ indicates an operational integral gain. At the same time, the INT portion is stored in the RAM as a learning amount $L_2'$ for the WG control.

In step 136, the D portion is calculated from $KD \times (\Delta P - \Delta P')$, where KD indicates an operational differential gain and the result of the calculation is stored in the memory location M1 in the RAM. More specifically, a decision is made from the control flag condition $FL_1$ whether the control is being performed on the VN side or WG side. If the result of the decision is that the control is being carried out in the VN control zone, the gain $KD_1$ for VN is calculated while if the control is carried in the WG side, the gain $KD_2$ for WG is selectively calculated. After this calculation, the operation now moves to step 137, where another decision is made if the control flag $FL_1$ is "0". If the result of the decision is NO, i.e., $FL_1$ = "1", the operation moves to step 138, where the $D_2$ portion is added to the control amount for the WG side and the result of the calculation is stored in M2 +2.

On the other hand, however, if the result of the decision is YES, i.e., $FL_1$ = "0", the operation moves to step 139, where $D_1$ portion is added to the control amount for the VN side and its result is stored in M2.

In step 140, the deviation $\Delta P' = P_{set} - P'$ at this time is stored in the RAM in order to calculate the D portion to be carried out in the next time operation.

In steps 141 and 142, the values stored in the memory locations M2 and M2 +2 (the results of calculation on each corrected amount to the basic control duty) are read from the memory locations M2 and M2 +2 in the RAM as the final control duty $OUT_1$ and $OUT_2$. As the upper and lower limits are provided when restoring the values, each of the control values for the VN and the WG sides is restricted within a ranged defined by the limits. After these operations, the processing now moves to step 212 of the control program for VN and WG.

Description is now made for the over-boost control for improving the acceleration performance of the vehicle by increasing temporarily the supercharge pressure at the suddenly accelerated condition. Basically, the over-boost control is achieved by the correction of the feedforward control amount and by increasing the target supercharge pressure.

Figure 4B:
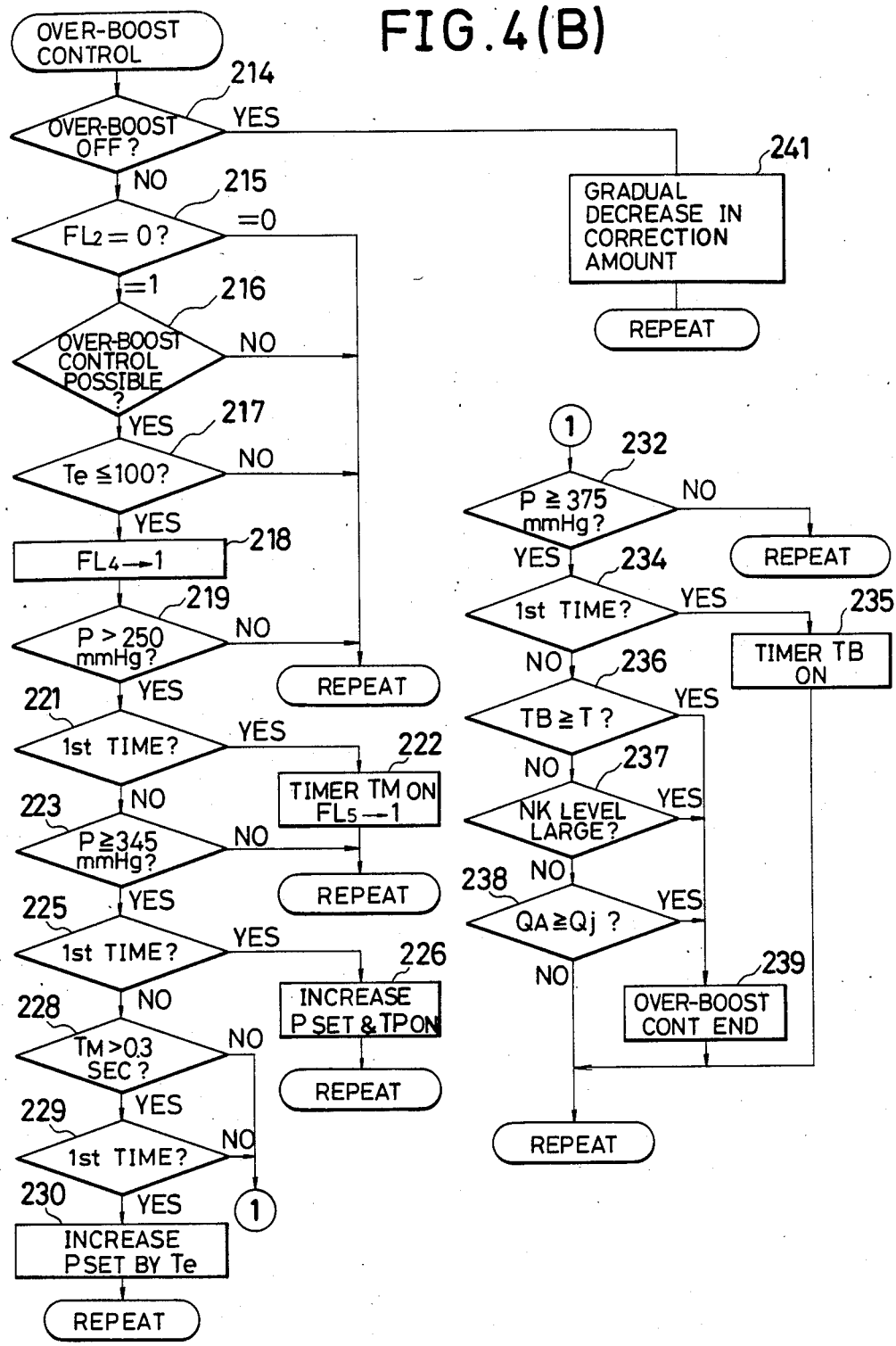

FIG. 4(B) shows a control flow chart for the over-boost control in which various flags are set or reset. FIG. 6(A) shows a control flow chart for the suddenly accelerated condition determining and processing. The processing of this control shown in FIG. 6(A) is executed once for every 10 ms, different from the foregoing operations and processings.

After starting operation, in step 300, the actual supercharge pressure P is stored in the RAM, and the operation goes to step 301, where a decision is made if the actual supercharge pressure thus detected is below a predetermined supercharge pressure $P_{set}$ = 100 mmHg. If the result of the decision is YES, that is, $P < P_{set}$, the operation moves to step 302, where various control flags are reset and the initialization of various control variables are performed.

However, if the result of the above decision is NO, the operation now moves to step 303, where a decision is made if $P > P_{set}$ = 100 mmHg occurred for the first time. If the result of the decision is YES, the operation goes to step 304, where a timer $T_A$ for measuring the time duration of the accelerated condition is started. After this operation, the operation goes to step 305, where a decision reference time $T_j$ for determining the suddenly accelerated condition is calculated from the following equation in accordance with the engine speed, the gear position, etc., at the preset or target supercharge pressure value of $P_{set}$ = 100 mmHg and it is stored in the RAM. Namely, the decision reference time $T_j$ can be defined from a decision line in the experiment values shown in FIG. 12(B). That is;

$$T_j = \frac{156250}{\text{Engine speed (rpm) at 100 mmHg}} \times 10 \text{ ms}$$

If the value of the timer $T_A$ for measuring the accelerated time falls above the decision line, it is determined that it is not suddenly accelerated condition. However, if the value of the timer $T_A$ falls below the decision line, it is determined as being in the suddenly accelerated condition.

Figure 12A:
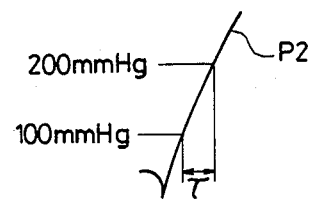
FIG. 12(A) illustrates an accelerated time period during which the actual supercharge pressure is increased from 100 mmHg to 200 mmHg.
Figure 12B:
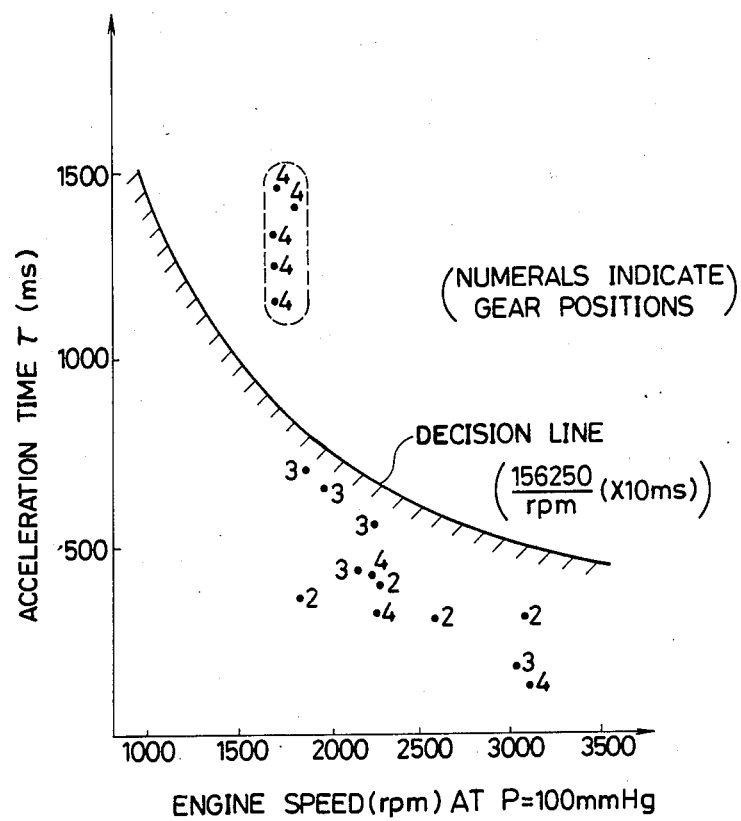
FIG. 12(B) illustrates experimental values of engine speed vs. accelerated time for explaining a sudden acceleration utilizing the decision line.

IN FIG. 12(B), the numbers indicated in the drawing, such as 2, 3, 4 show each of the gear positions 1 to 4 of the transmission, selected. Among these gear positions, there is no problem up to the third speed of the gear positions as they fall the area below the decision line. However, in the low engine speed zone such as at fourth speed gear position 4, the accelerated time $\tau$ from during the change in the actual supercharge pressure from 100 mmHg to 200 mmHg is actually distributed in the area above the decision line as shown in the dotted line circle. Accordingly, it is necessary that the decision line is moved to an area beyond the very zone indicated by the dotted circle with respect to the fourth speed, low speed zone of the gear. The decision reference time $T_j$ has thus been settled by taking into consideration of the above fact, with a predetermined value being added to the decision line in FIG. 12(B). For these reasons, the gear positions are taken into consideration when defining the decision reference time value.

If the result of the decision in step 303 is NO, that is, $P > P_{set}$ occured more than twice, the operation now moves to step 307. In step 307, a decision is made if the actual supercharge pressure P is above a second predetermined target supercharge pressure value of 200 mmHg. If the result of this decision is NO, that is the actual supercharge pressure P is below the value $P_o$, no decision for the suddenly accelerated condition is carried out.

However, if the result of the above decision is YES, i.e., the P is equal to or more than $P_{set}$ = 200 mmHg, the operation goes to step 308, a decision is made if the value of the timer $T_a$ is below the predetermined decision reference time $T_j$ described in the foregoing. Namely, the duration of the accelerated time $\tau$ measured by the timer $T_A$, which is shown in FIG. 12(A) (the time during which the actual supercharge pressure is changed from 100 to 200 mmHg as described above) is below the reference time $T_j$ determined in step 305. If the result of the decision is YES, that is $\tau < T_j$, the operation goes to step 309, where the control flag $FL_2$ is set at "1" since this is the suddenly accelerated condition.

On the other hand, however, if the result of the above decision is NO, the operation, i.e., $\tau > T_j$, the operation terminates.

In such a manner as described, a decision for the suddenly accelerated condition and a necessary control for supercharge pressure can be performed. The result of the acceleration control flag bit FL condition is used for the VN and WG control shown in FIG. 4(A), the supercharge feedback control shown in FIG. 5 and the over-boost control shown in FIG. 4(B) will be described below.

FIG. 4(B) shows a control flow chart for performing an optimum over-boost control. The routine of this control program is executed once before executing the control program shown in FIG. 4(A) for the VN and WG control, so as to obtain necessary information or conditions.

In FIG. 4(B) after starting the operation, in step 214 a decision is made if the over-boost control is terminated properly. This is to check the result of the operations performed in steps 236 to 239 which terminate the over-boost control as will be described below.

If the result of the decision is that the control is terminated, the operation goes to step 241, where a processing for gradually lowering the target value, that is, the processing for gradually reducing the feedforward control amount during the over-boost control, is carried out.

Figure 6B:
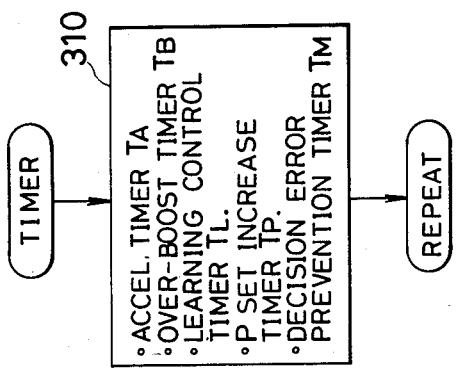
FIG. 6(A) and 6(B) are control flow charts for carrying out an acceleration judgement or decision according to the present invention.
Figure 6A:
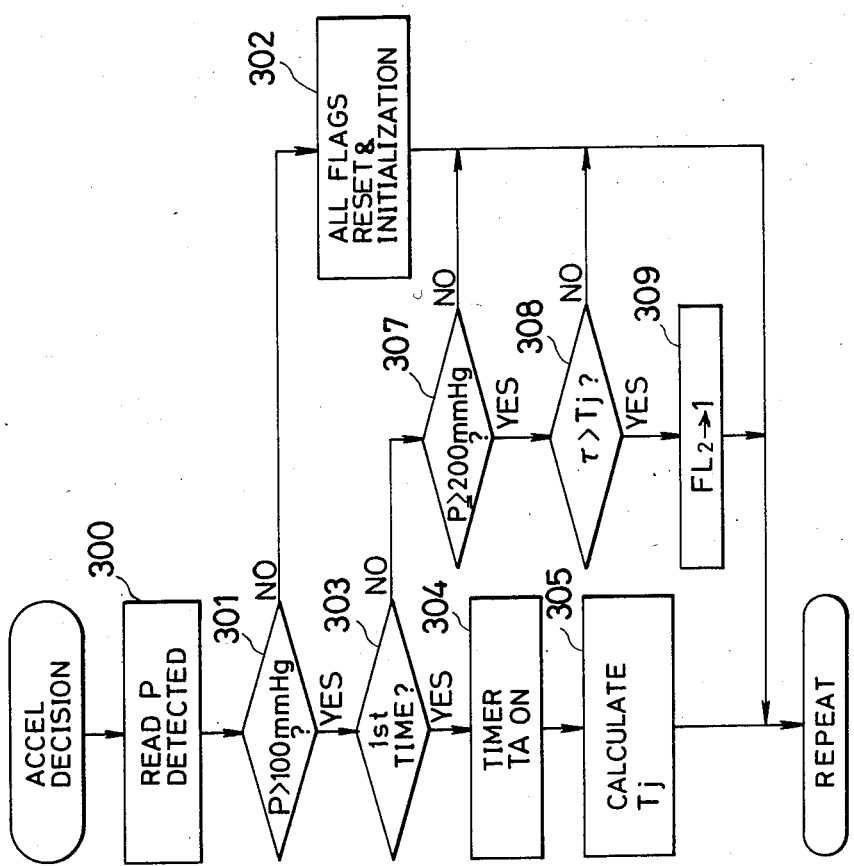

On the other hand, if the result of the above decision is No, i.e., the control has not yet been terminated, the operation goes to step 215, where the condition of the control flag for the suddenly accelerated condition of the vehicle, which has been either set or reset in the processing in FIG. 6 (A), is checked. If, in this case, the result of the flag $FL_2$ is set at "1", the operation terminates. However, if the result of the decision is NO, the operation moves to step 216 as it is in the suddenly accelerated condition.

In step 216, a decision is made if the over-boost control is possible in accordance with data such as types of engine, types of vehicles, which have preliminarily stored in the ROM. If the result of the decision is that the over-boost control is possible, the operation now goes to step 217, where the engine cooling water temperature Te is checked if it is below a predetermined temperature value, e.g., 100° C. If the result of the checking in step 217 is NO, that is the water temperature is above 100° C., the over-boost control is not performed as abnormal burning of the engine tends to occur.

On the other hand, however, if the result of the above checking is YES, i.e., the engine cooling water temperature Te is below the predetermined temperature value of 100° C., the operation now moves to step 218, where the control flag $FL_4$ for the WG feedforward correction start is set at "1". After this operation, the operation goes to step 219, where a decision is made if the actual supercharge pressure P exceeds the predetermined supercharge pressure of 250 mmHg. If the result of this decision is NO, the operation terminates. However, if the result of the above decision is YES, i.e., the actual supercharge pressure P exceeds the value $P_{set}=250$ mmHg, the operation goes to step 221, where another decision is made if the actual supercharge pressure P exceeds the value of 250 mmHg for the first time. If the result of this decision is YES, the operation now goes to step 222.

Figure 16:
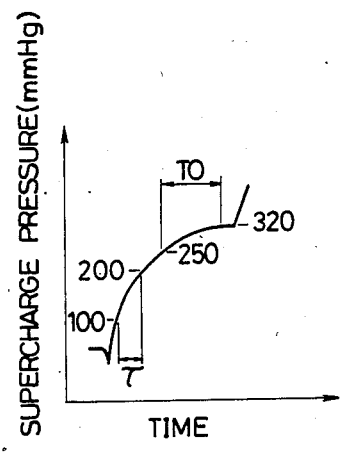
FIG. 16 is the characteristic curve of supercharge pressure for explaining a decision error for the suddenly accelerated condition.

In step 222, a timer $T_M$ for preventing an erroneous decision for the suddenly accelerated condition is started to operate, while the control flag $FL_5$ for the VN side feedforward correction start is set at "1". The measuring time of the timer for preventing a maldecision or decision error is checked in step 125 in FIG. 5 for the preventive operation for the suddenly accelerated decision error described in the foregoing. If the time measured by the timer takes more than three seconds until the actual supercharge pressure reaches 320 mmHg beyond 250 mmHg, this case is not determined as being the suddenly accelerated condition. Accordingly, the control flag $FL_2$ for determining the sudden acceleration and the control flag for feedforward correction start on the VN side are set at "0". As shown in FIG. 16, in the accelerated condition from the throttle valve opening of ¼ at the second speed position of the gear, the time $\tau$ for determining the suddenly accelerated condition is short and this condition is determined as being the sudden acceleration. Accordingly, this operation is for preventing the degradation of derivability because of a possible sudden fluctuation in the actual supercharge pressure when entering the over-boost control after the acceleration is terminated.

Namely, when the time $T_o$ measured by the timer $T_M$ for preventing the misdecision becomes above $T_o \geq 3$ until the actual supercharge pressure reaches 320 mmHg from 250 mmHg, this is not considered as being the sudden acceleration.

Returning to step 221, if the result of the decision in step 221 is that the actual supercharge pressure P exceeds the predetermined supercharge pressure value of 250 mmHg after second times, the operation goes to step 223, where another decision is made if the actual supercharge pressure P exceeds $P_{set}=345$ mmHg. If the result of this decision is YES that is $P \geq 345$ mmHg the operation goes to step 225, where the actual supercharge pressure exceeded the predetermined value of 345 mmHg for the first time. If the result of the decision is YES, the operation moves to step 226, where the timer $T_p$ for measuring the time of increase in the target supercharge pressure is operated so as to increase the target supercharge pressure value $P_{set}$ and the operation terminates.

In step 225, if the result of the above decision is NO, that is P exceeded P=345 mmHg only after second times, the operation goes to step 228, where a decision is made if the timer $T_p$ which was operated in step 226 has elapsed the predetermined time of 0.3 seconds. If the result of this decision is YES, the operation now moves to step 229, where another decision is made if the elapse of the predetermined time of 0.3 seconds measured by the timer $T_p$ is for the first time. If the result of this decision is YES, the operation now goes to step 230.

Figure 10B:
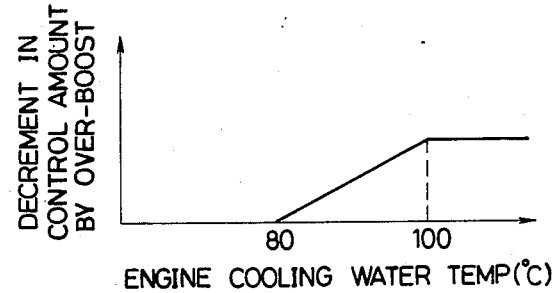
FIG. 10(B) is the characteristic curve of engine cooling water temperature vs. decrement in the control amount due to the over-boost control to be used in the present invention.

In step 230, the over-boost control amount is calculated in accordance with the engine cooling water temperature, so as to increase the target supercharge pressure. Namely, as shown in FIG. 10(B), an optimum over-boost control amount is calculated in such a manner that the higher the water temperature becomes, the lower the target supercharge pressure $P_{set}$ of 425 mmHg becomes during the overboost control from a look-up table in accordance with the engine water temperature.

In the manner as described, according to the present invention, the timing for increasing the target value of supercharge pressure is further delayed in the accelerated condition a predetermined time, e.g. 0.3 seconds when the actual supercharge pressure has exceeded the target value. As a result, the overshoot phenomena in which the actual supercharge pressure largely exceeds the target supercharge pressure temporarily, can be avoided.

Figure 17:
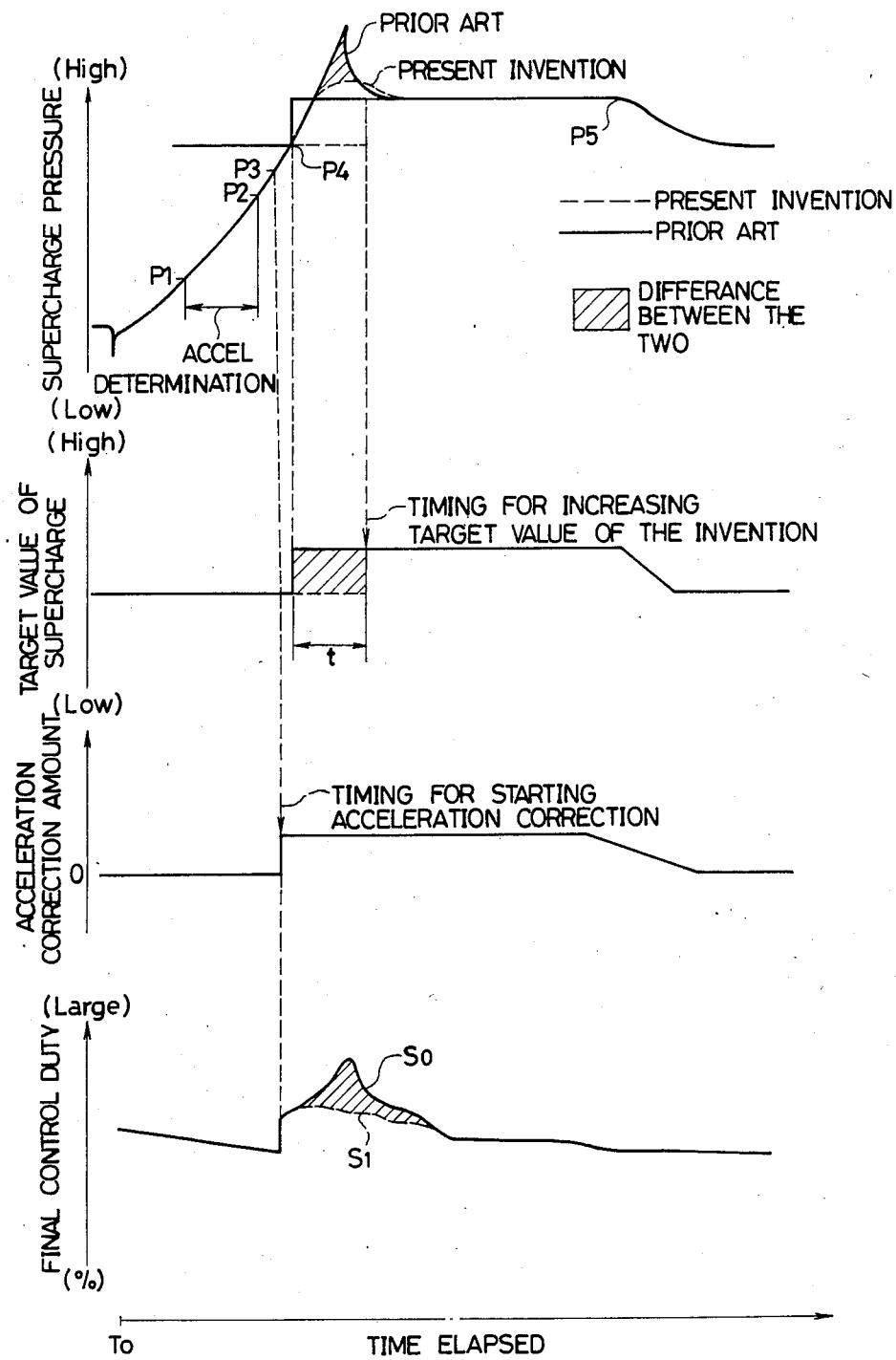
FIG. 17 illustrates one embodiment of the feedback control to the capacity changing means side according to the present invention.

That is, when the decision for acceleration is performed during the time period from $P_1$ to $P_2$ of the supercharge pressure after entering into the accelerated condition as shown in FIG. 17, the control amount on the VN side is added by the correction value for the acceleration. This in turn further causes the actual supercharge pressure to be increased. When the actual supercharge pressure reaches the target value or point $P_4$, the target point of supercharge pressure is increased to $P_5$ after a predetermined time period t from that point.

In the above case, when the actual supercharge pressure P exceeds the target point $P_5$, the control amount is corrected by a feedback control in the direction of decrease in the actual supercharge pressure, i.e. so as to increase the opening of the capacity changing means. However, because of the delay in the feedback control, the actual supercharge pressure continues to increase as it is, and then it begins to be lowered. In this manner as described above, when the actual supercharge pressure begins to be decreased, the target point is increased to $P_5$ according to the present invention. As a result, the actual supercharge pressure never deviates so largely from the target supercharge pressure thus increased because of the feedback control for achieving agreement of the actual supercharge pressure to the increased target point of $P_5$, according to the present invention.

According to the prior art, in this respect, when the changeover of the target point is carried out at the target point $P_4$ which is the normal operating condition, the actual supercharge pressure P abruptly increases to the point $P_4$ and in addition, the target point is also increased to $P_5$. As a result, the control amount tends to be increased so as to further reduce the opening of the control valve, thereby increasing the actual supercharge pressure largely with this condition. Accordingly, in the prior art, even if the correction is performed by the feedback control after the actual supercharge pressure has been reached $P_5$, the overshoot phenomena of the actual supercharge pressure occurred, with the actual supercharge pressure far beyond the target point $P_5$, due to the delay in the feedback control and its suddenly increased characteristic of the control.

Moreover, in the prior art, the actual supercharge pressure is normally maintained high compared with the normal operation time by the correction for acceleration. As a result, when the actual supercharge pressure is increased largely above the target point, although temporarily, overload of the engine occurs and the durability of the engine tends to be often damaged.

According to the present invention, on the other hand, when performing the over-boost control of the actual supercharge pressure in the accelerated condition, the target point of supercharge pressure is stepped up after delaying a predetermined time period at the initial time period, during which the actual supercharge pressure is suddenly increased. As a result, the actual supercharge pressure never largely exceeds the target point, although temporarily, thus realizing an intensive protection of the engine.

Now, the operation is moved from step 228 or 229 to step 232, and in steps after 232, terminating conditions of the over-boost control are checked. Namely, in step 232, a decision is made if the actual supercharge pressure P is above a predetermined value of 375 mmHg.

If the result of this decision is NO, the operation of this routine terminates. However, if the result of this decision is YES, i.e., $P \geq 375$ mmHg, the operation goes to step 234, where another decision is made if the actual supercharge pressure P exceeded $P_{set}=375$ mmHg for the first time so as to measure the time elapsed after reaching the preset supercharge pressure value of 375 mmHg. If the result of this decision is YES, the operation goes to step 235, where a timer $T_B$ for measuring the over-boost control time is started. However, when the actual supercharge pressure exceeded the value of 375 mmHg after two second times, the operation goes to step 236, where a decision is made if the timer $T_B$ for measuring the over-boost control time started in step 235 has exceeded a predetermined time.

If the result of this decision is YES, the operation goes to step 239, where the overboost control is terminated. On the other hand, however, if the result of the above decision is NO, the operation now goes to step 237, where a decision is made if knocking level (NK) is larger than a predetermined value. If the result of the knocking level is larger than the predetermined value, i.e., YES case, the over-boost control terminates so as not to produce the knocking phenomena. However, if the result of the above decision is NO, the operation moves to the next step.

Namely, in step 238, a decision is made if the actual intake air flow rate $Q_A$ is equal to or larger than the decision intake air flow $Q_J$ for interrupting the over-boost control. If the result of this decision is YES, the operation goes to step 239, where the over-boost control is terminated in order to prevent an abnormal combustion of the engine.

Now, description is made for the learning control for correcting the deviation of the feedforward control amounts for VN and WG. As regards the control for the VN side, the timing for calculating the learning amount is the timing indicated in step 110 in FIG. 5. Namely, the feedback control is switched from the VN side to the WG side. Let it be assumed that the learning amount $L_1$ in this case is the INT portion stored in the RAM in step 134 in FIG. 5. This means that the constant deviation portion when the supercharge pressure is controlled by VN is added in advance to the feedforward control amount from the next control.

Actual learning amount calculation will now be described with reference to FIG. 7. After starting the operation of this program, a decision is made if the over-boost control is being performed from the control flag $FL_2$ in step 400. It is also possible to calculate the learning amount even if the over-boost control is not carried out. When performing the over-boost control, however, the value of the $INT_1$ portion is large in order to expand the control area for the VN side. Accordingly, the control accuracy can be improved when the control is performed by this large value. As a result, the calculation for the learning amount is to be carried out just after the over-boost control has been performed in this embodiment. No calculation for the learning amount is carried out in the accelerated condition where no over-boost control is performed, the operation goes to step 401, the correction amount during the over-boost control is subtracted from the constant deviation $L_1$ obtained from step 134, which is about 15 percent in terms of the control duty value, and the result of the subtraction is used as a new learning amount $L_1'$. This calculation is carried out so as to optimize the basic control duty when the over-boost control is not being performed. In step 402, the new learning amount $L_1'$ is added to the previous learning amount $L_1$ and the resulting value of this calculation is stored in the RAM as a learnt value $VL_1 = L_1 + L_1'$ for VN. The reason for carrying out this calculation is for the purpose of converting the learnt value to an optimum value. The up-to-date learnt value $VL_1$ of the result thus stored in the RAM is updated when satisfying the feedback control reset conditions and it is reflected to the control from next time. Namely, in step 121 in FIG. 5, the up-to-date learnt value $VL_1$ thus stored is updated when the reset conditions of the feedback control is satisfied, where the actual supercharge pressure P is below the preset value of 320 mmHg and the actual intake air flow rate $Q_A$ is equal to or smaller than the predetermined intake air flow rate $Q_{set}$ for WG. This updated result of the learning is reflected in the subsequent control.

In the above case, the timing of the updating has been described as satisfying two conditions, but it may also possible to satisfy a condition that the actual supercharge pressure is equal to or smaller than at least a predetermined supercharge pressure.

The learning control for WG is carried out as follows; The timing for performing the calculation of the learning amount is the condition determined in step 112, i.e., it is performed after 1.2 seconds after the feedback control is switched from the VN side to the WG side. The learning amount is assumed to be the INT portion stored in the RAM as $INT_2$ in step 135. This means that the constant deviation portion when the supercharge pressure is being controlled by WG is added to the feedforward control amount. Actual calculation of the learning amount is carried out as follows; After operation is started, a decision is made in step 404 if the time measured by a timer $T_L$ for starting the learning control for WG is above a predetermined time of 1.2 seconds, which was started when the feedback control had been switched to the WG side in step 109 in FIG. 5.

If the result of the decision is NO, that is the measured time is below the predetermined time value of 1.2 seconds, no calculation is performed. However, if the result of the decision is YES, the operation goes to step 405, where the constant deviation $L_2'$ calculated at this time in step 135 in FIG. 5 is added to the learning amount $L_2$ obtained previously and the result is stored in the RAM as a new learnt value $VL_2$, similar to the calculation of the VN side. The up-to-date learnt value $VL_2$ is updated in step 121 in FIG. 5 similarly in the case of the VN side. Such a manner as described, the calculations of the learning amounts for each of VN and WG are performed at an optimum timing, respectively. Each of the values $VL_1$ and $VL_2$ thus updated is added to the basic control amount $BD_1$ or $BD_2$ in steps 208 or 203 in FIG. 4(A), so as to correct the feedforward control amount.

As described in the foregoing embodiment according to the present invention, when performing the overboost control of the actual supercharge pressure in the accelerated condition by the capacity changing means, the timing for increasing the target value of supercharge pressure is delayed a predetermined time period after entering the accelerated condition. As a result, the feedback control of the actual supercharge pressure towards a target value lower than the value required at the initial time period of the acceleration. Consequently, even if the overshoot of the actual supercharge pressure occurs, the actual supercharge pressure never largely exceeds a high target value required in the accelerated condition, thus securely avoiding the execessive supercharge of the engine and also preventing the durability of the engine from being reduced.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method for controlling supercharge pressure of a turbocharger, said method comprising the steps of:
    detecting an acceleration condition of an engine based on an operating condition of the engine;
    Performing a feedback control of the supercharge pressure by using a capacity changing means for changing the exhaust gas flow speed of the engine when the actual supercharge pressure has reached a first predetermined value after the acceleration condition is detected, said feedback control including correcting a control amount for operating the capacity changing means to control the supercharge pressure; and
    increasing a first target value of the supercharge pressure when predetermined time passes after the actual supercharge pressure reaches a second target value from said first predetermined value.

2. A method as claimed in claim 1 wherein said predetermined time is 0.3 seconds.

3. A method as claimed in claim 1 further comprising the step of performing an over-boost control for temporarily increasing the supercharge pressure.

4. A method as claimed in claim 3 further comprising the step of judging whether the actual supercharge pressure is smaller than a predetermined supercharge pressure to determine the operational region of the feedback control.

5. A method as claimed in claim 4 further comprising the step of judging whether the actual intake air flow rate exceeds a predetermined air flow rate to determine the operational region of the feedback control.

6. A method as claimed in claim 3 wherein the over-boost control is performed by correcting an accumulated value of the difference between the actual and target supercharge pressures based on a feedforward control amount.

7. A method as claimed in claim 3 wherein the target supercharge pressure is increased during the overboost control when the temperature of the engine cooling water is lower than a predetermined temperature.

8. A method as claimed in claim 1 further comprising the step of lowering the actual supercharge pressure by bypassing the exhaust gas flow from the turbocharger during an intital period of a suddenly accelerated condition.

9. A method as claimed in claim 3 further comprising the step of increasing a set intake air flow for judging the feedback control region during the overboost control.

10. An apparatus for controlling supercharge pressure of a turbocharger, comprising:
    means for detecting operating conditions of an engine;
    capacity changing means provided in the exhaust outlet of the engine for changing the exhaust gas flow speed of the engine;
    exhaust bypass valve means provided in the exhaust outlet of the engine for changing the exhaust gas flow of the engine through the turbocharger;
    first valve means connected to the capacity changing means for controlling the capacity changing means in accordance with a first control duty signal for controlling the supercharge pressure;
    second valve means connected to the exhaust bypass valve means for controlling the exhaust bypass valve means in accordance with a second contorl duty signal for controlling the supercharge pressure; and
    control means for producing said first and second control signals and selectively controlling said first and second valve means in accordance with parameters representative of the operating conditions of the engine.

11. A control apparatus as claimed in claim 10, wherein look-up tables and data for calculating the control duties for the first and second valve means have preliminarily been stored in the control means.

12. An apparatus for controlling supercharge pressure of a turbocharger which comprises:
   means for detecting the actual supercharge pressure of an engine;
   means for calculating the deviation between the actual supercharge pressure and a target supercharge pressure;
   means for calculating a control variable for controlling the exhaust gas flow of the turbine in accordance with a parameter representative of at least an integral value of the deviation of the supercharge pressure;
   means for judging an acceleration condition of the engine;
   means for adding a predetermined correction amount to said control variable when the acceleration condition is detected by said judging means;
   means for setting and increasing said target supercharge pressure in the acceleration condition of the engine; and
   means for increasing the target supercharge pressure after a predetermined time has passed since the actual supercharge pressure detected by said detecting means exceeds a predetermined value.

* * * * *